United States Patent
Quinlan et al.

(10) Patent No.: US 10,050,722 B2
(45) Date of Patent: Aug. 14, 2018

(54) SIGNAL GENERATOR, PROCESS FOR MAKING AND USING SAME

(71) Applicants: NATIONAL INSTITUTE OF STANDARDS AND TECHNOLOGY, Gaithersburg, MD (US); Tara Foriter, Boulder, CO (US); Antoine Rolland, Boulder, CO (US); Franklyn Quinlan, Boulder, CO (US)

(72) Inventors: Franklyn J. Quinlan, Longmont, CO (US); Scott Diddams, Louisville, CO (US); Tara Fortier, Boulder, CO (US); Antoine Rolland, Boulder, CO (US)

(73) Assignee: The United States of America, as Represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 14/872,078

(22) Filed: Sep. 30, 2015

(65) Prior Publication Data
US 2016/0043810 A1 Feb. 11, 2016

Related U.S. Application Data

(60) Provisional application No. 62/065,098, filed on Oct. 17, 2014.

(51) Int. Cl.
*H04B 10/90* (2013.01)
(52) U.S. Cl.
CPC ....... *H04B 10/90* (2013.01); *H04B 2210/006* (2013.01)
(58) Field of Classification Search
CPC ............................ H04B 10/6164; H04B 10/61
(Continued)

(56) References Cited

U.S. PATENT DOCUMENTS 5,770,977 A 6/1998 Uurtamo
7,026,594 B2 4/2006 Holzwarth et al.
(Continued)

OTHER PUBLICATIONS

T.M. Fortier, et al., Generation of Ultrastable Microwaves via Optical Frequency Division, Nature Photonics, 2011, 425-429, vol. 5.
(Continued)

*Primary Examiner* — David Payne
*Assistant Examiner* — Omar S Ismail
(74) *Attorney, Agent, or Firm* — Office of Chief Counsel for National Institute of Standards and Technology

(57) ABSTRACT

A signal generator includes an optical pulse source to provide a plurality of optical pulses; a photosensitive element configured to receive optical pulses and to produce an electrical signal from optical pulses 6, electrical signal 10 including a spectrum that includes a plurality of discrete frequencies that occur at a repetition rate corresponding to that of the optical pulses or a harmonic thereof; a frequency selector to receive the electrical signal from the photosensitive element, to select dynamically the harmonic from the electrical signal and to communicate the dynamically selected harmonic; a direct digital synthesizer (DDS) to receive the harmonic of the electrical signal from the frequency selector and to produce a first output; and a frequency converter to receive the harmonic from the frequency selector and the first output from the DDS, wherein the frequency converter shifts a frequency of the harmonic by an amount substantially equal to a frequency of the first output from the DDS to produce a second output.

2 Claims, 28 Drawing Sheets

(58) Field of Classification Search
USPC .......................................................... 398/208
See application file for complete search history.

(56) References Cited

U.S. PATENT DOCUMENTS

| | | | | |
|---|---|---|---|---|
| 2004/0081467 | A1* | 4/2004 | Taylor | H01L 29/155 |
| | | | | 398/161 |
| 2006/0056560 | A1* | 3/2006 | Aweya | H03L 7/0992 |
| | | | | 375/356 |
| 2010/0098408 | A1* | 4/2010 | Lohl | G04F 10/00 |
| | | | | 398/16 |

OTHER PUBLICATIONS

T.J. Endres, et al., Design and Analysis Methods of a DDS-Based Synthesizer for Military Spaceborne Applications, IEEE International Frequency Control Symposium Proceedings, 1994, 624-632.

* cited by examiner

US 10,050,722 B2

SIGNAL GENERATOR, PROCESS FOR MAKING AND USING SAME

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is a signal generator that comprises an optical pulse source to provide a plurality of optical pulses; a photosensitive element configured to receive optical pulses and to produce an electrical signal from optical pulses 6, electrical signal 10 comprising a spectrum that comprises a plurality of discrete frequencies that occur at a repetition rate corresponding to that of the optical pulses or a harmonic thereof; a frequency selector to receive the electrical signal from the photosensitive element, to select dynamically the harmonic from the electrical signal and to communicate the dynamically selected harmonic; a direct digital synthesizer (DDS) to receive the harmonic of the electrical signal from the frequency selector and to produce a first output; and a frequency converter to receive the harmonic from the frequency selector and the first output from the DDS, wherein the frequency converter shifts a frequency of the harmonic by an amount substantially equal to a frequency of the first output from the DDS to produce a second output.

Further disclosed is a signal generator that comprises an optical pulse source to provide a plurality of optical pulses; a photosensitive element configured to receive optical pulses and to produce an electrical signal from the optical pulses, the electrical signal comprising a spectrum that comprises a plurality of discrete frequencies that occur at a repetition rate corresponding to that of the optical pulses or a harmonic thereof; a frequency selector to receive the electrical signal from the photosensitive element, to select dynamically the harmonic from the electrical signal and to communicate the dynamically selected harmonic; a direct digital synthesizer (DDS) to receive the harmonic of the electrical signal from the frequency selector and to produce a first output; a frequency converter to receive the harmonic from the frequency selector and the first output from the DDS, wherein the frequency converter shifts a frequency of the harmonic by an amount substantially equal to a frequency of the first output from the DDS to produce a second output; and a frequency extender to receive the second output from the frequency converter and to produce a third output.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a signal generator described herein has advantageously and unexpectedly high spectral purity, frequency stability, large frequency tuning range, high frequency tuning resolution, and rapid tuning speed.

Figure 1:
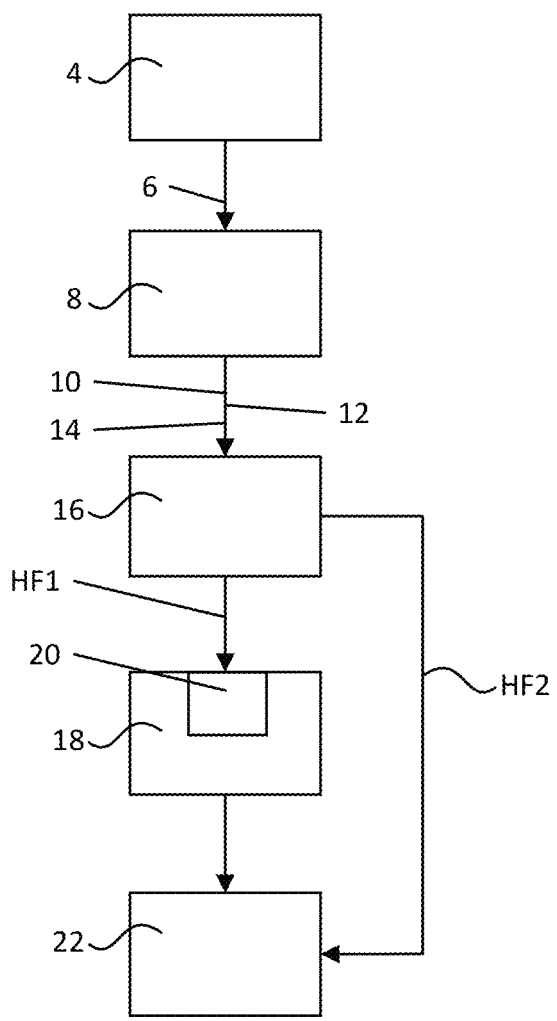
FIG. 1 shows a signal generator.

In an embodiment, as shown in FIG. 1, signal generator 2 includes: optical pulse source 4 to provide a plurality of optical pulses 6; photosensitive element 8 configured to receive optical pulses 6 and to produce electrical signal 10 from optical pulses 6, electrical signal 10 having spectrum 12 that includes a plurality of spaced (e.g., equally spaced) discrete frequencies 14 occurring at repetition rate that corresponds to that of optical pulses 6 or a harmonic thereof; frequency selector 16 to receive electrical signal 10 from photosensitive element 8, to select dynamically harmonic HF from electrical signal 10 and to communicate the dynamically selected harmonic HF; direct digital synthesizer 18 (DDS) to receive harmonic HF of electrical signal 10 from frequency selector 16 (in an embodiment harmonic HF is a lower frequency harmonic) and to produce first output Out1; and frequency converter 22 to receive harmonic HF from frequency selector 16 and first output Out1 from DDS 18, wherein frequency converter 22 shifts a frequency of harmonic HF by an amount substantially equal to a frequency of first output Out1 from DDS 18 to produce second output Out2.

Figure 2:
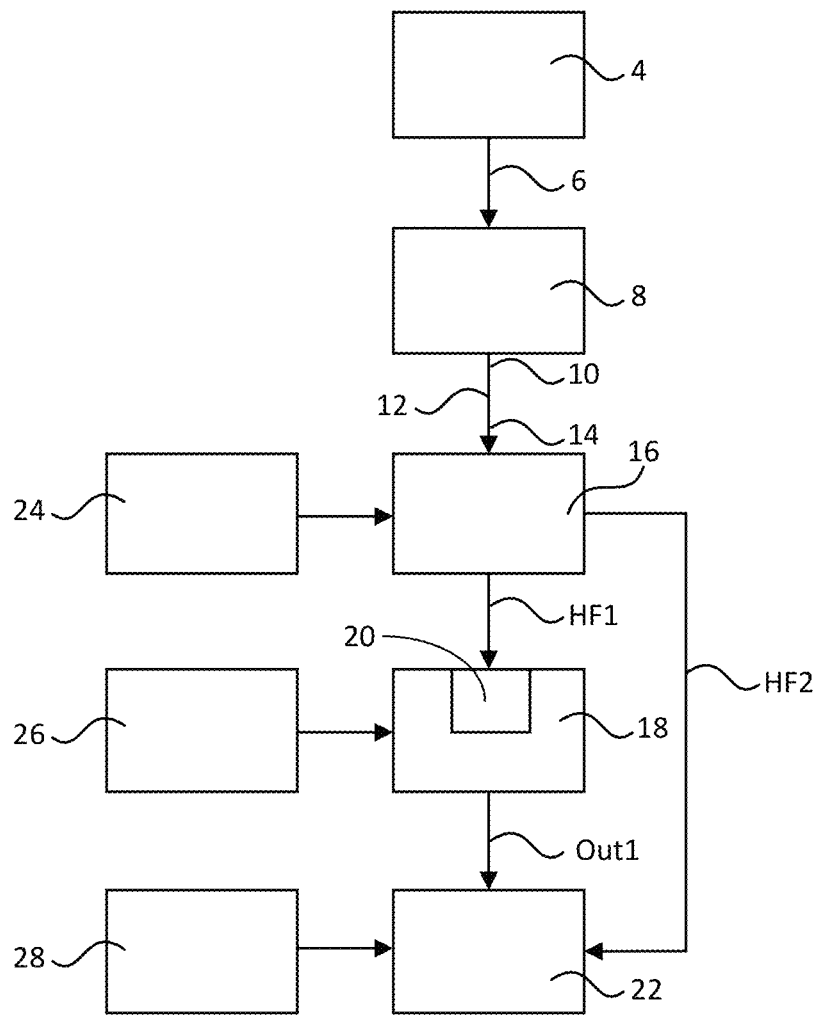
FIG. 2 shows a signal generator.

According to an embodiment, as shown in FIG. 2, signal generator 2 includes controller 24 to control frequency selector 16; controller 26 to control frequency converter 22; controller 28 to provide a frequency control word to DDS 18.

Figure 3:
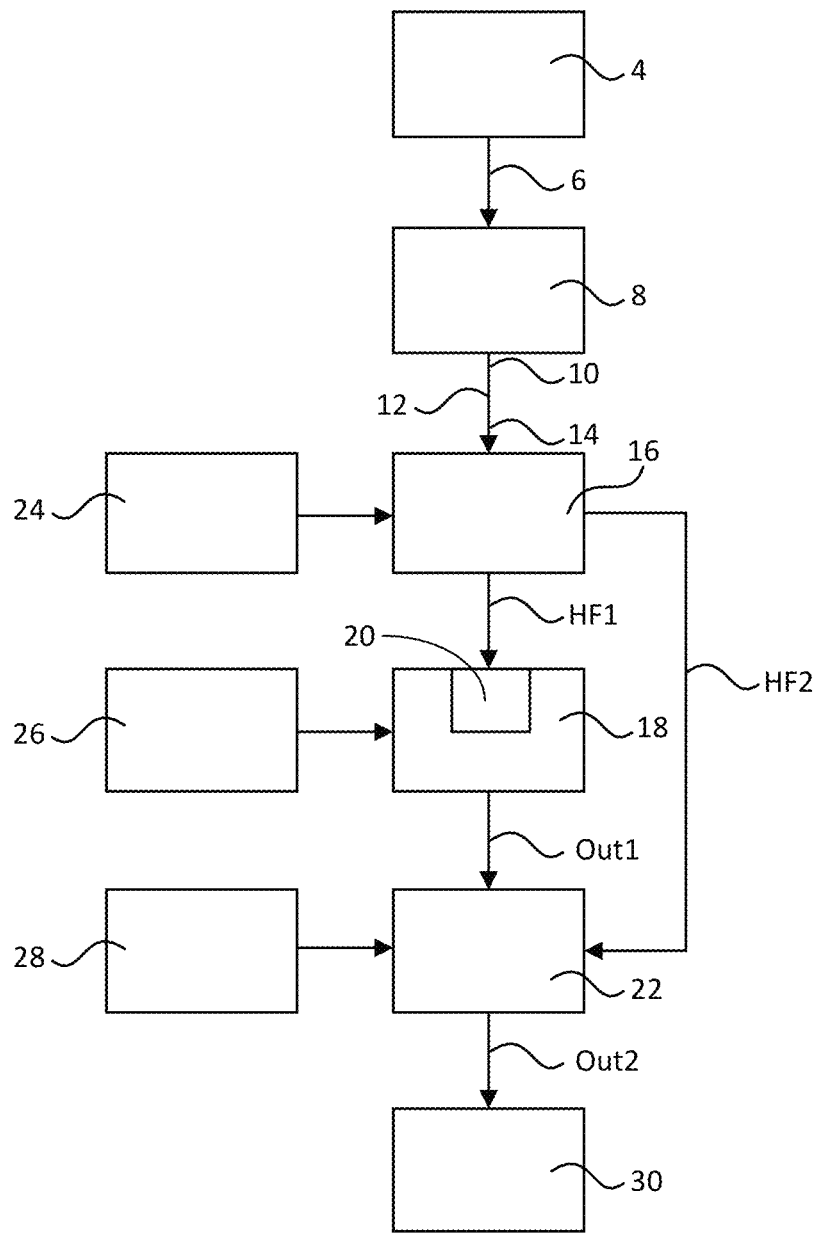
FIG. 3 shows a signal generator.

In an embodiment, as shown in FIG. 3, signal generator 2 includes frequency extender 30 to receive second output Out2 from frequency converter 22 and to produce third output Out3.

According to an embodiment, when a maximum frequency of first output Out1 of DDS 18 is greater than or equal to a line spacing of the discrete frequencies 14 in the spectrum 12 of electrical signal 10 (e.g., a plurality of optically-derived microwave harmonics), frequency converter 22 produces second output Out 2 that includes an arbitrary frequency that is within a photodetection bandwidth of photosensitive element 8. A length of a tuning word received by DDS 18 from controller 26 determines a resolution (e.g., a frequency resolution) of second output Out2 having the arbitrary frequency.

According to an embodiment, a clock rate of DDS 18 determines a tuning speed (e.g., a time to change from a primary output frequency to a secondary output frequency) of signal generator 2. The tuning speed can be less than or equal to 5 microsecond (µs), specifically less than or equal to 1 µs, and more specifically less than or equal to 400 nanoseconds (ns).

Figure 4:
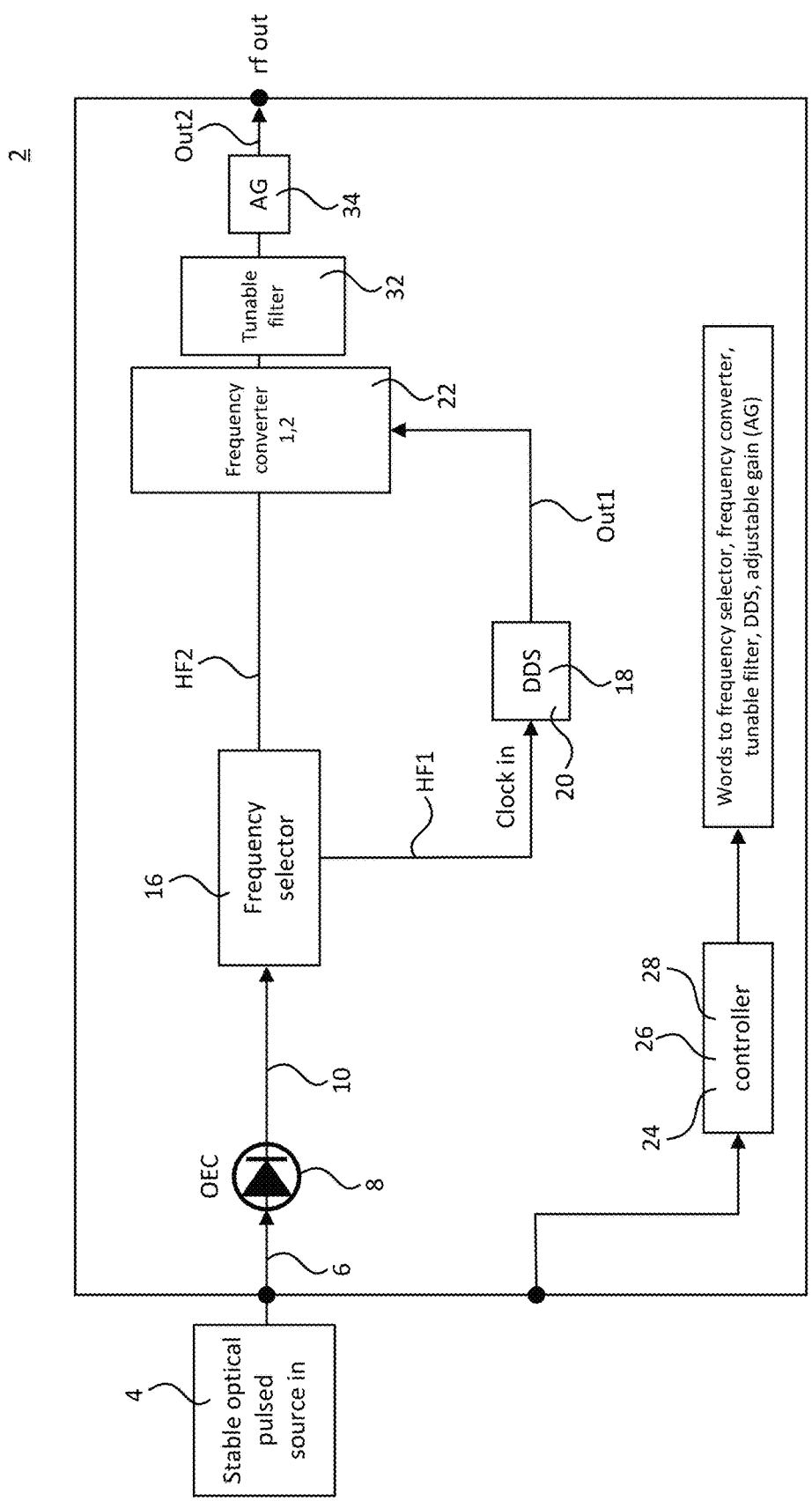
FIG. 4 shows a signal generator.

According to an embodiment, as shown in FIG. 4, signal generator 2 includes optical pulse source 4 to produce optical pulses 6 to illuminate photosensitive element 8 (e.g., a photodetector such as a photodiode) that is provided to generate electrical signal 10 that includes an optical pulse repetition rate FR and harmonics thereof. Electrical signal 10 is communicated from photosensitive element 8 is transmitted to frequency selector 16 that isolates a selected harmonic HF, which can be selected by frequency selector controller 24. Frequency selector 16 produces a frequency that is transmitted to frequency converter 22 as harmonic HF2 and to DDS 18 as harmonic HF1. Here, frequency selector 16 splits a power of harmonic HF included in electrical signal 10 and communicates harmonic HF1 to DDS 18 at clock source 20 of DDS 18. In an embodiment, harmonic HF1 received by clock source 20 is not a same harmonic that is transmitted to frequency converter 22 as harmonic HF2.

In a certain embodiment, harmonic HF1 sent to DDS 18 from frequency selector 16 is a same frequency as harmonic HF2 that is transmitted to frequency converter 22. First output Out1 produced by DDS 18 is received by frequency converter 22, and the frequency of harmonic HF2 is shifted by the frequency of Out1 from DDS 18. Second output Ou2 is an output frequency of frequency converter 22 and is increased or decreased relative to harmonic HF2 by the frequency of first output Out1 from DDS 18, as selected. Second output Out2 produced by frequency converter 22 can be filtered, e.g., by tunable filter 32, or an adjustable gain can be applied to second output Out2 from frequency converter 22 by adjustable gain amplifier 34.

Figure 5:
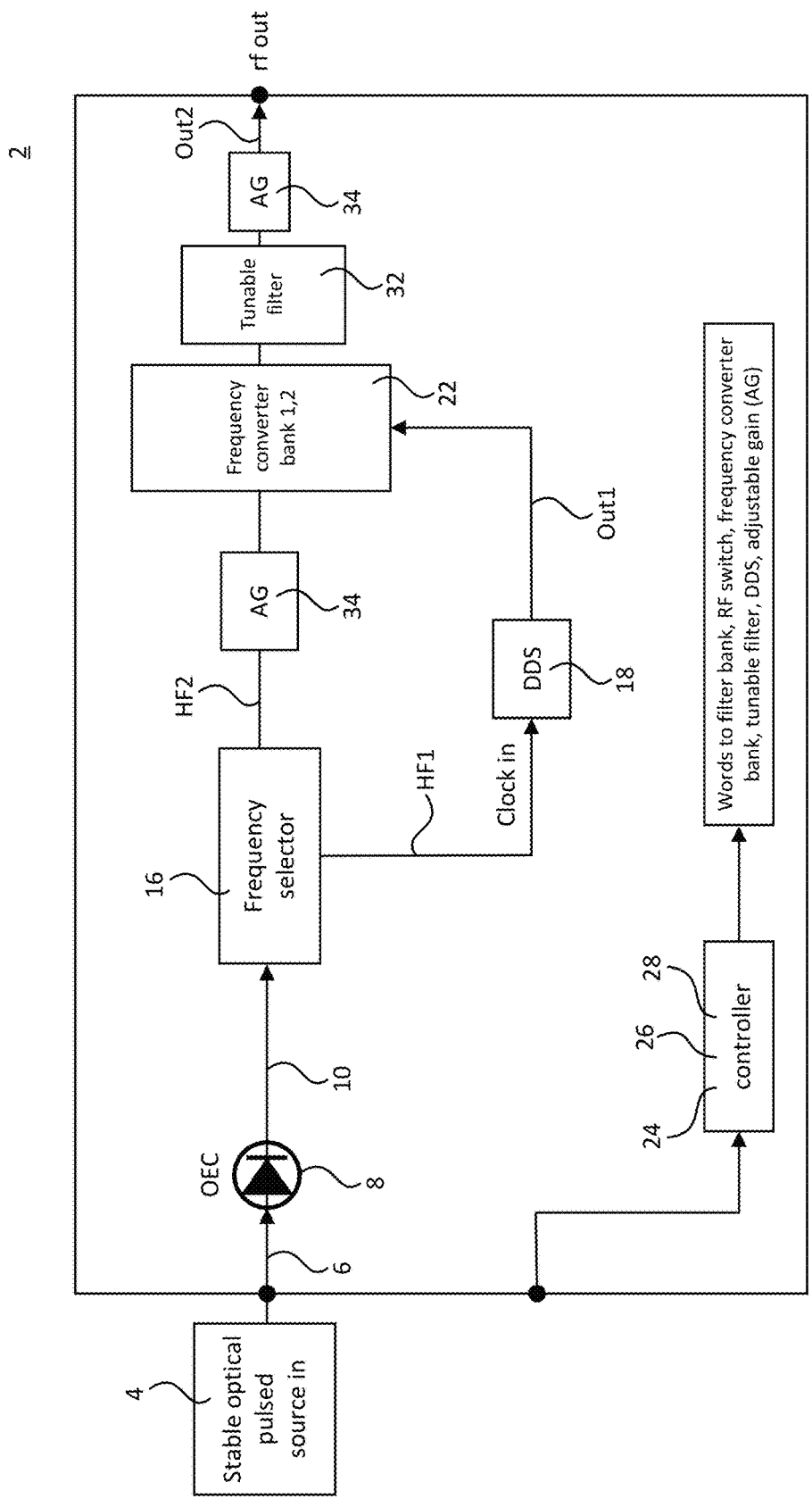
FIG. 5 shows a signal generator.

According to an embodiment, as shown in FIG. 5, adjustable gain amplifier 34 is interposed between frequency selector 16 and frequency converter to amplify harmonic HF2.

Figure 6:
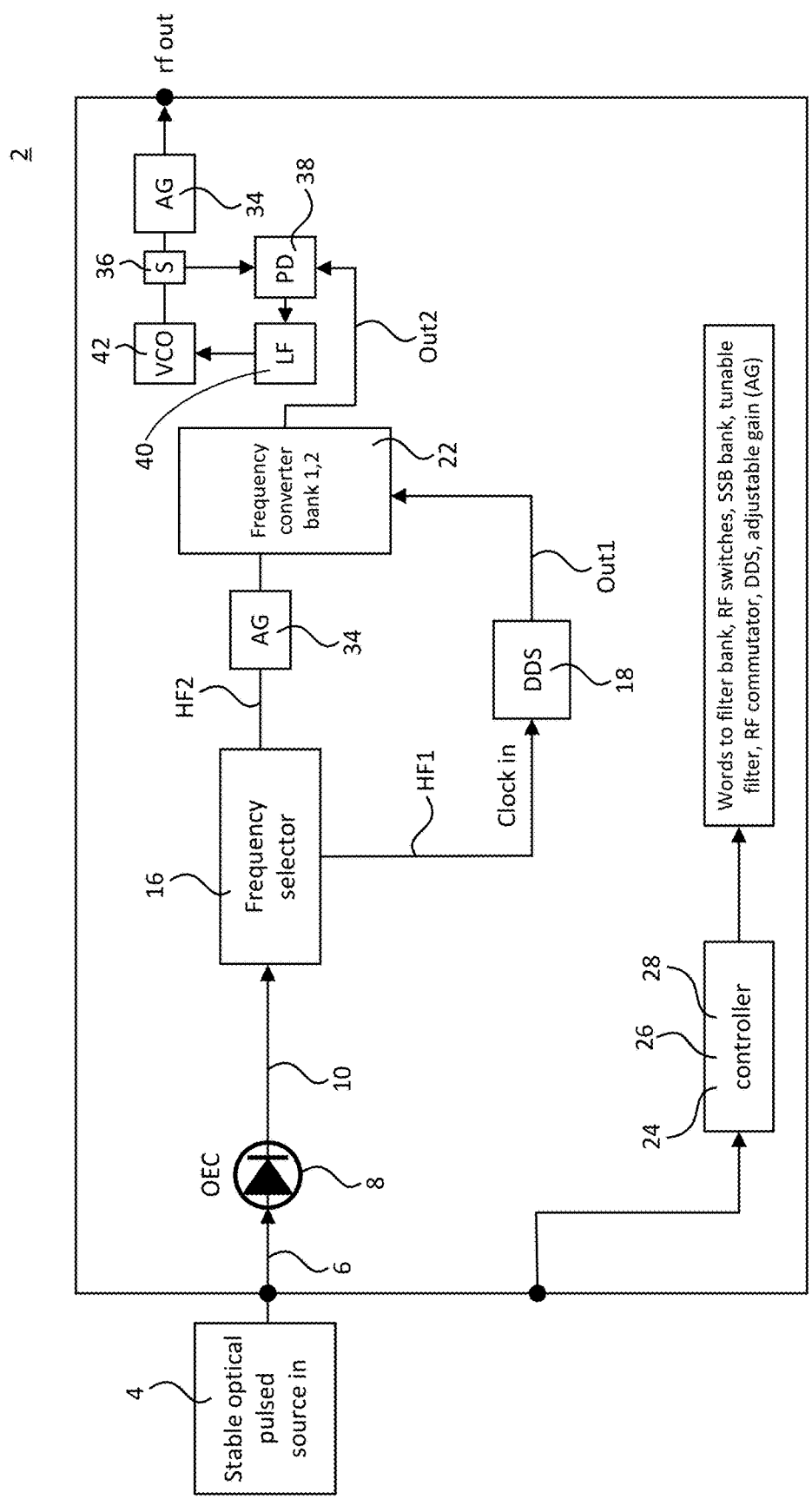
FIG. 6 shows a signal generator.

According to an embodiment, as shown in FIG. 6, a photodiode 38 receives second output Out2 from frequency converter 22 and communicates an output to loop filter 40 (LF), which is in communication with voltage controlled oscillator 42 from which a signal is split by splitter 36 and sent to photodiode 38 and also to amplifier 34. Here, voltage controlled oscillator 42 filters second output Out2.

Figure 7:
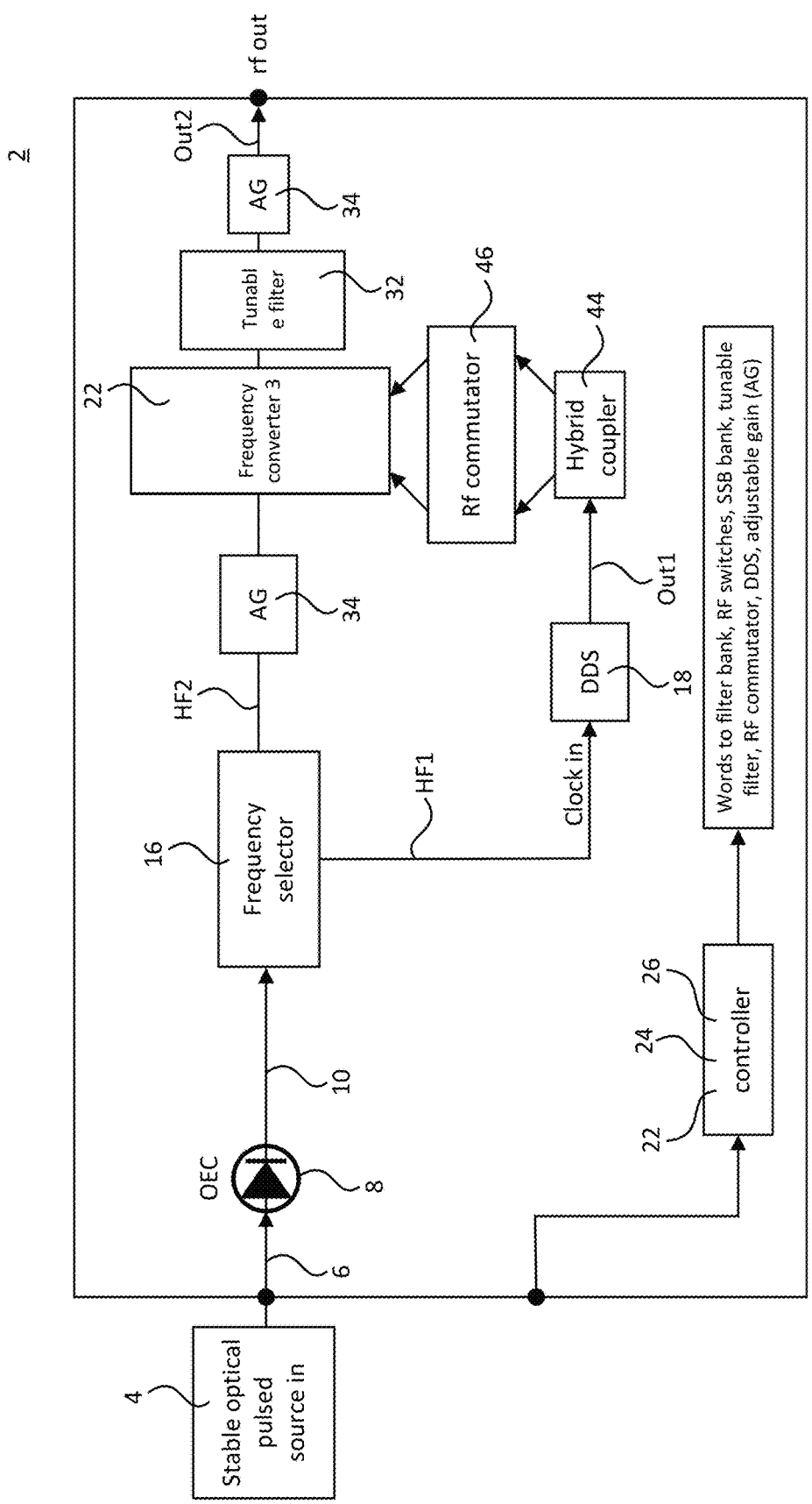
FIG. 7 shows a signal generator.

According to an embodiment, as shown in FIG. 7, it is contemplated that frequency converter 22 is a single side band (SSB) mixer, and signal generator 2 includes hybrid coupler 44 to receive first output Out1 from DDS 18 and is in communication with RF commutator 46 that is in communication with frequency converter 22. Here, commutator 46 determines a sign of tuning.

Figure 8:
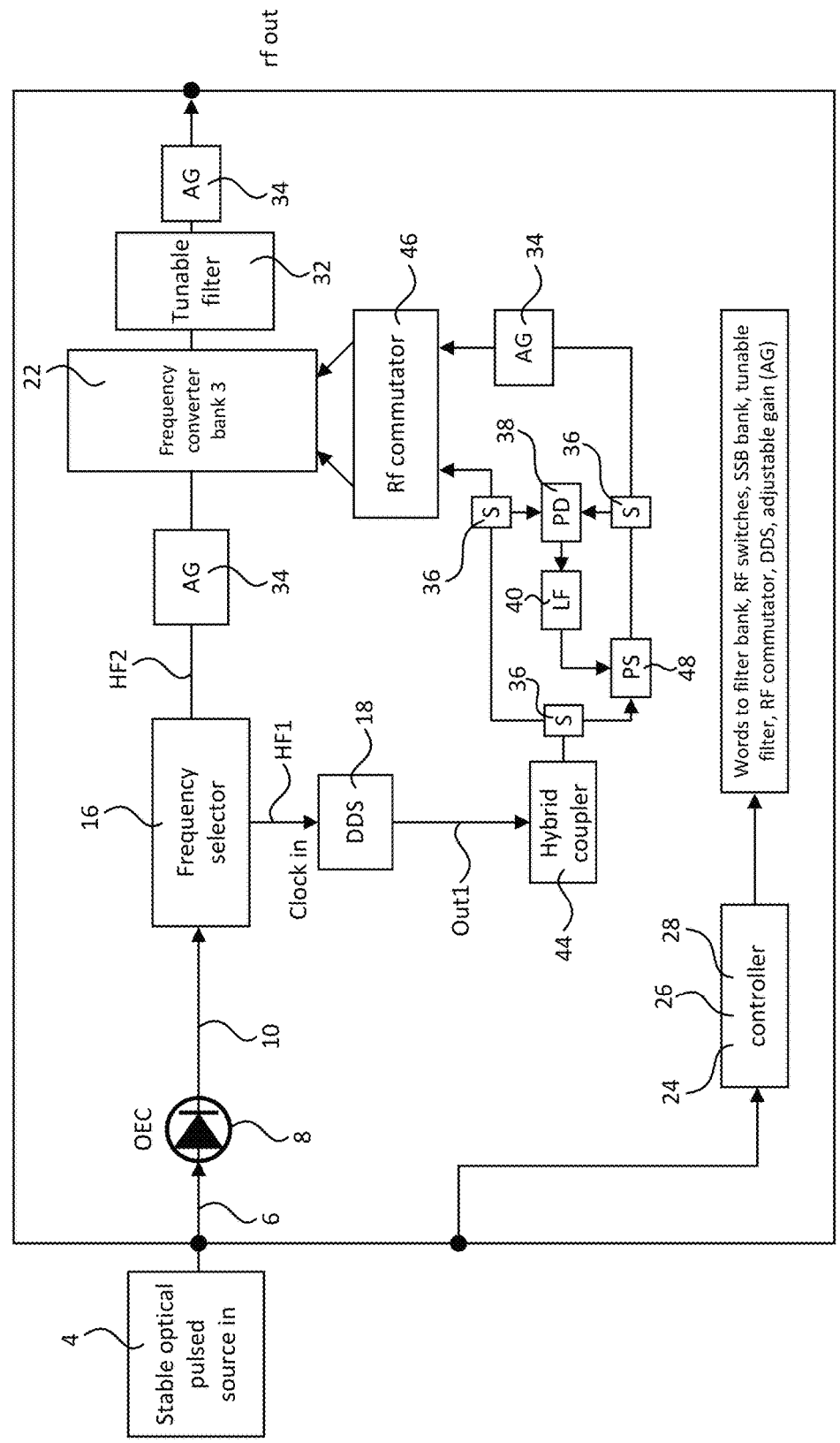
FIG. 8 shows a signal generator.

According to an embodiment, as shown in FIG. 8, signal generator 2 includes hybrid coupler 44 to receive first output Out1 from DDS 18 and is in communication with RF commutator 46 that is in communication with frequency converter 22. Here, commutator 46 determines a sign of tuning. Filtering is performed by PS 48, LF 40, and phase detector38 (PD) interposed between hybrid couple or 44 and commutator 46.

Figure 9:
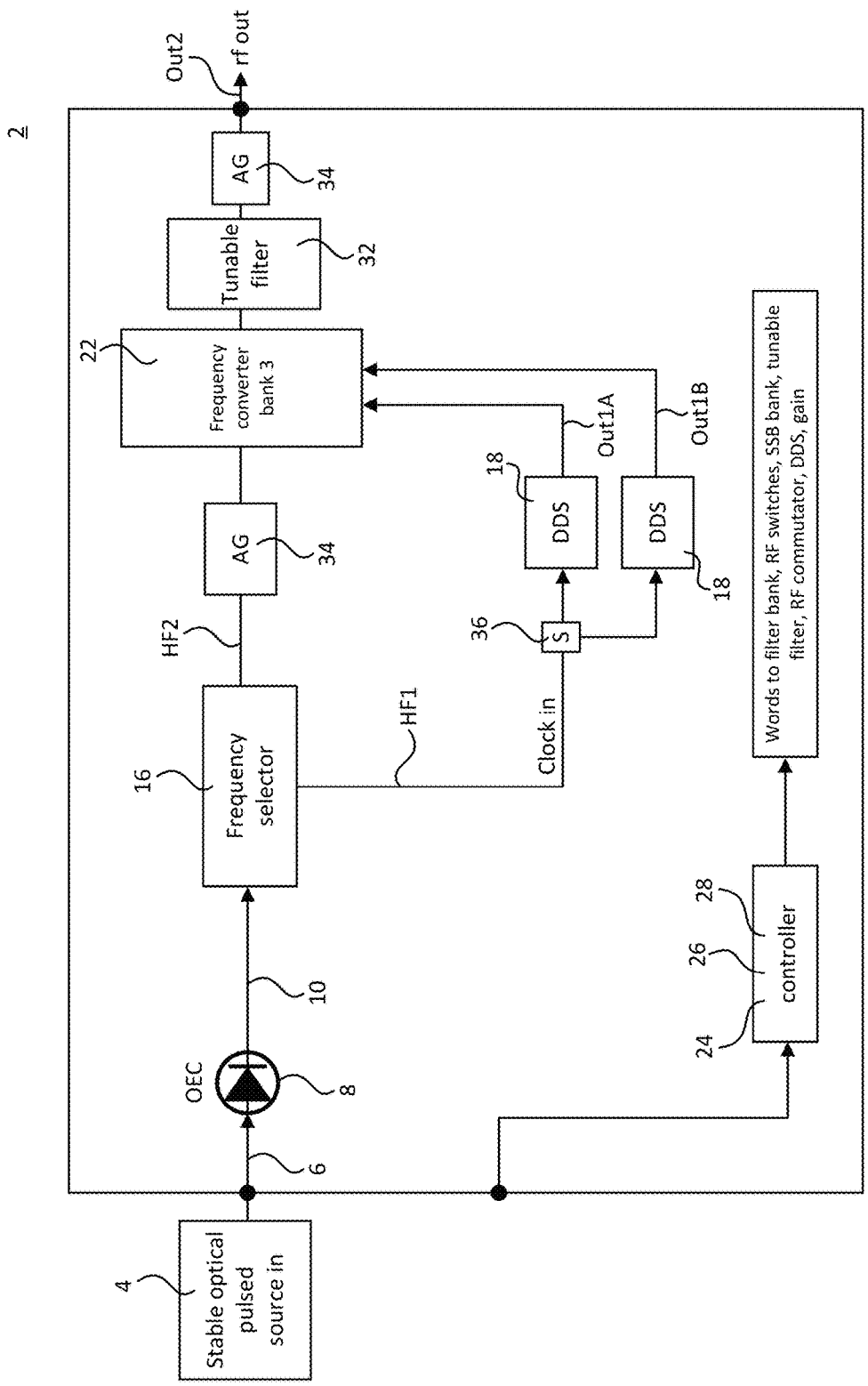
FIG. 9 shows a signal generator.

In an embodiment, as shown in FIG. 9, harmonic HF1 (also referred to herein as clock signal) from frequency selector 16 is split by splitter 36 and communicated to a plurality of DDSs 18 (e.g., two DDSs: DDS1, DDS2). Output (Out1A, Out1B) from DDSs 18 have a same frequency but with a 90 degree phase shift in a relative phase between the two outputs (Out1A, Out1B). The two DDS 18 outputs (Out1A, Out1B) are communicated to frequency converter 22 to convert the frequency of harmonic HF2. The frequency shift of harmonic HF2 can be positive or negative as determined by whether a phase of DDS1 leads or lags a phase of DDS2.

Figure 10:
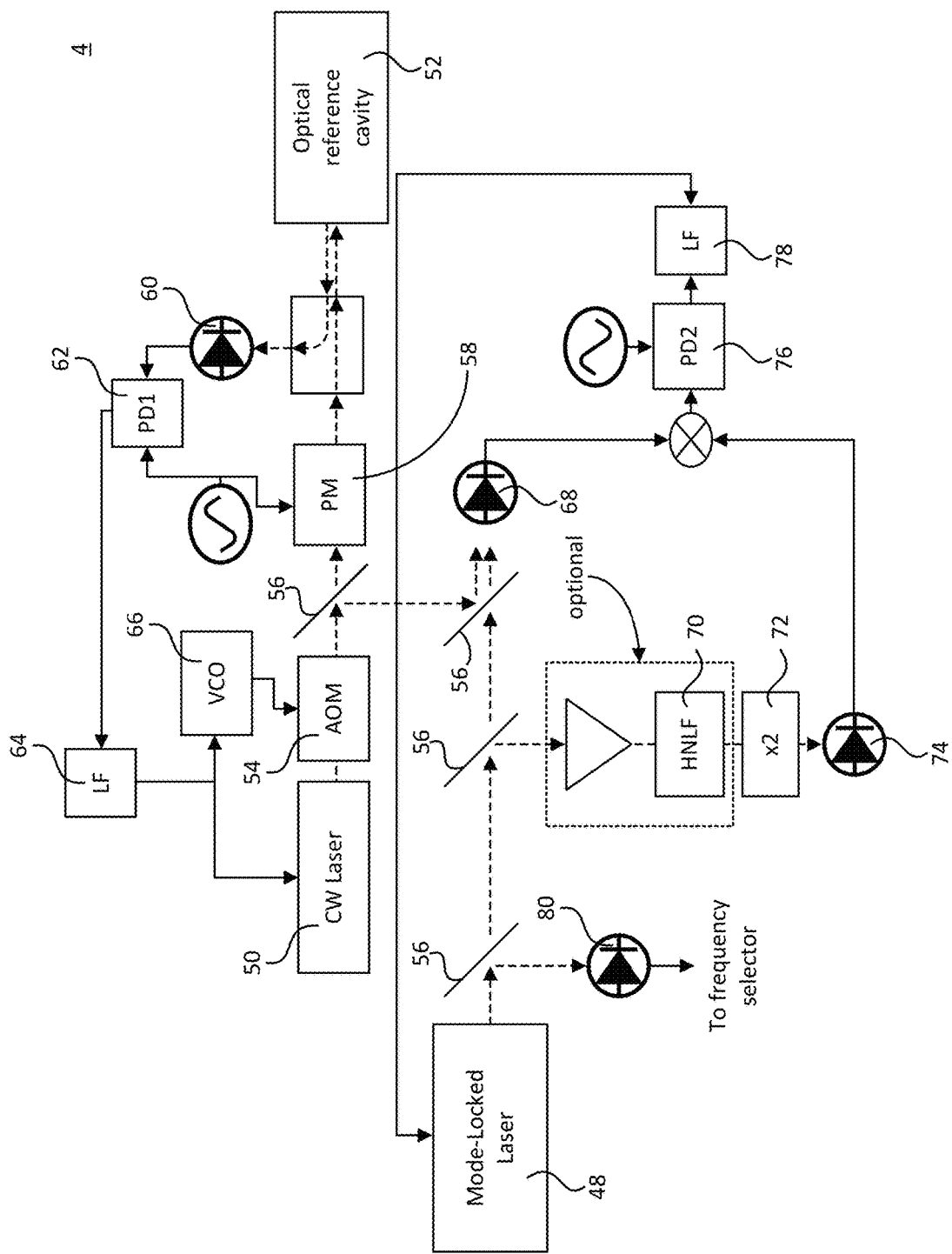
FIG. 10 shows an optical pulse source.

In an embodiment, with reference to FIG. 10, high spectral purity microwaves are generated by signal generator 2 from repetition-frequency-stabilized optical pulse source 4. This is done by stabilizing the repetition frequency to an optical frequency reference. The optical frequency reference is, e.g., an optical atomic clock, a Fabry-Perot cavity, a whispering-gallery mode resonator, or a waveguide delay line. Here, FIG. 10 shows optical pulses generated by mode-locked laser 48 whose repetition rate is stabilized to CW laser 50 that is in turn stabilized to optical reference cavity 52 (e.g., a Fabry-Perot cavity). The output of continuous-wave laser 50 is passed through acousto-optic modulator 54 (AOM) that can shift the frequency of the incident laser light. The output of AOM 54 illuminates beam splitter 56. A portion of the light from beam splitter 56 is sent to optical phase modulator 58 (PM). PM 58 modulates the optical phase at a fixed modulation frequency. After phase modulation, the CW laser light continues to optical reference cavity 52. Reflected light from optical reference cavity 52 is directed to photodetector1 60. Phase detector 62 (PD1) compares the output of photodetector1 60 to the same source that modulates phase modulator 58. Loop filter 64 is used at the output of phase detector1 60 to keep CW laser 50 locked to a resonance of the cavity 52 by actuating on CW laser frequency directly, or AOM 54 drive frequency via voltage controlled oscillator 66 (VCO). Dynamic range corrections are performed by acting on CW laser cavity or CW laser pump, whereas high-speed corrections are performed via AOM 54.

Referring to FIG. 10, some fraction of AOM 54 output is combined with mode-locked laser 48 output, creating a beat note on photodetector2 68 between stabilized CW laser 50 and a longitudinal mode of mode-locked laser 48. Some fraction of mode-locked laser 48 output is used for offset frequency detection, which is shown in FIG. 10 having optical amplification, octave-spanning super-continuum generation via highly nonlinear fiber 70 (HNLF), and an optical frequency doubler 72 that frequency-doubles the low frequency end of the optical spectrum. The frequency-doubled light interferes with the high frequency end of the optical spectrum on photodetector3 74. The optical beat note from photodetector2 68 and the offset frequency of photodetector3 74 are mixed, generating a signal that is independent of the offset frequency. The frequency of this signal is compared to a sine wave source via phase detector 76 (PD2). The output of PD2 76 is conditioned by loop filter 78, and used to control the repetition rate of mode-locked laser 48. This stabilizes the repetition rate of mode-locked laser 48 to the optical frequency reference. Another fraction of mode-locked laser 48 light is detected via photodetector4 80 and is sent to frequency selector 16.

Figure 11:
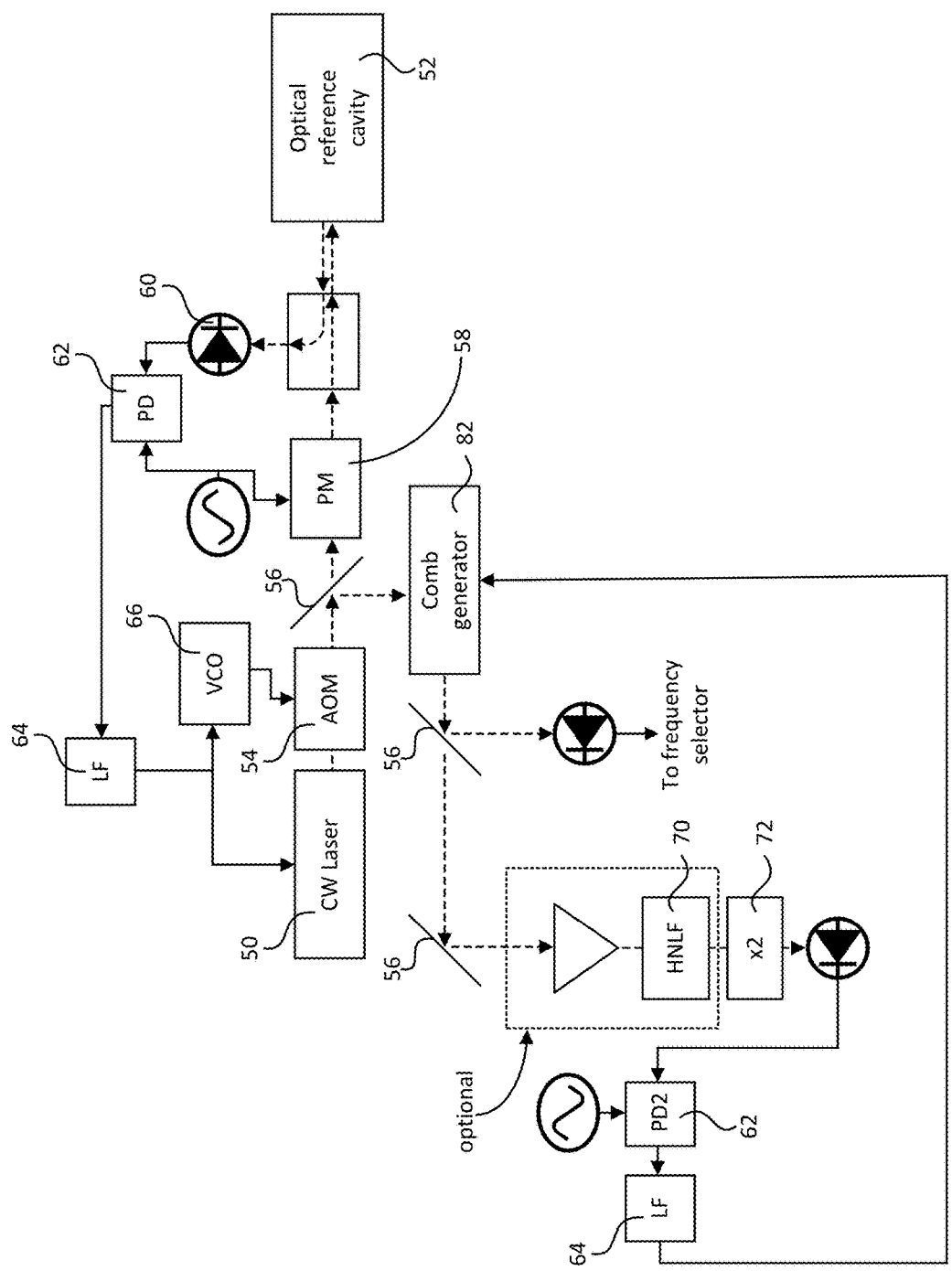
FIG. 11 shows an optical pulse source.
Figure 12:
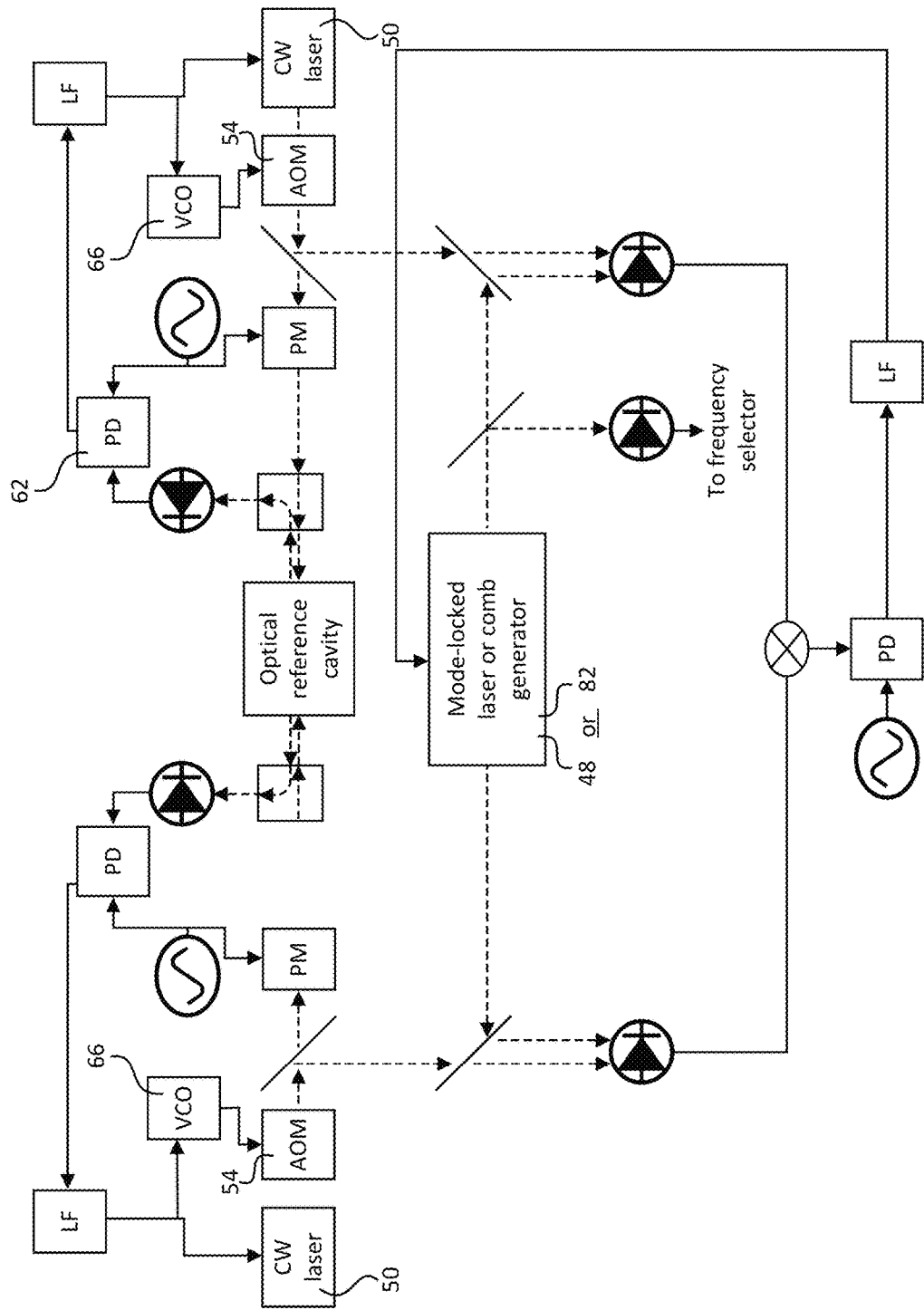
FIG. 12 shows an optical pulse source.

For optical pulse source 4 shown in FIG. 11, the optical reference is the same, but mode-locked laser 48 is substituted by frequency comb generator 82. Frequency comb generator 82 can be, e.g., a micro resonator to parametrically generate a frequency comb when illuminated by CW laser 50, or frequency comb generator 82 can be an electro-optic comb generator that includes a voltage controlled oscillator or an electro-optic modulator. Here, separate beat note detection between the optical frequency reference and comb generator 82 is optional since the comb can be generated directly from the optical reference.

Figure 16:
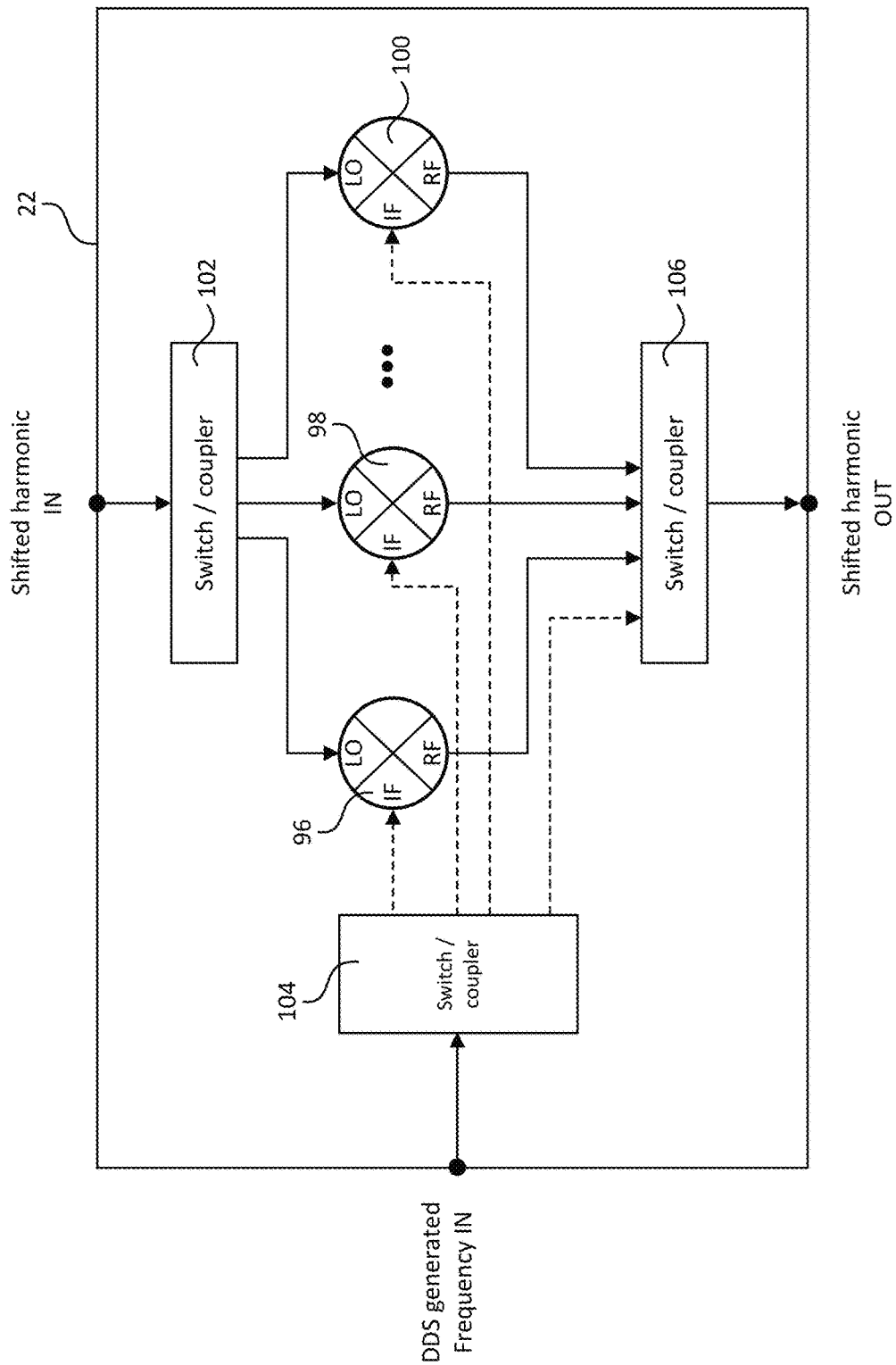
FIG. 16 shows a frequency converter.

In FIG. 16, two CW lasers 50 operating at two different frequencies are locked to the same optical reference cavity. Offset frequency detection of mode-locked laser 48 or frequency comb generator 82 is then replaced by beat note detection with the second CW laser 50.

Figure 13:
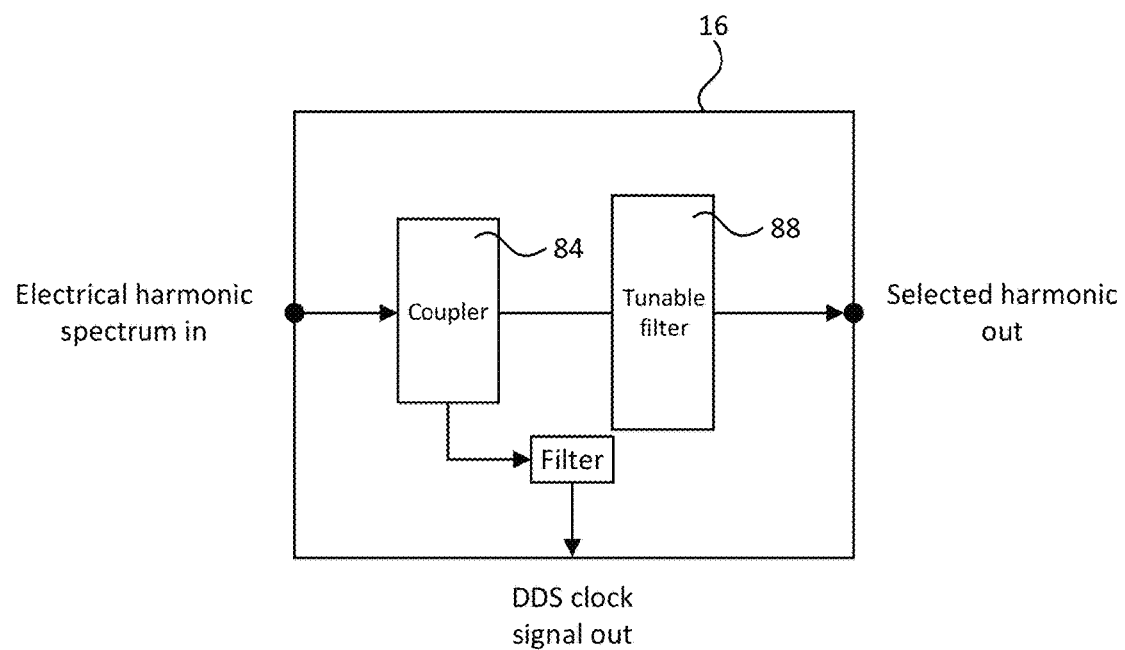
FIG. 13 shows a frequency selector.

In an embodiment, as shown in FIG. 13, frequency selector 16 receives the output of photosensitive element 8 (e.g., the photodiode) and splits the power with power coupler 84. An output of power coupler 84 is filtered at DDS 18 clock frequency and directed to DDS 18 clock input 20. The other output of power coupler 84 is filtered by tunable bandpass filter 86. Tunable filter 86 tuning range is, e.g., from a selected lowest frequency harmonic to a selected highest frequency harmonic, and a bandwidth of tunable filter 86 is less than the frequency spacing of the harmonics.

Figure 14:
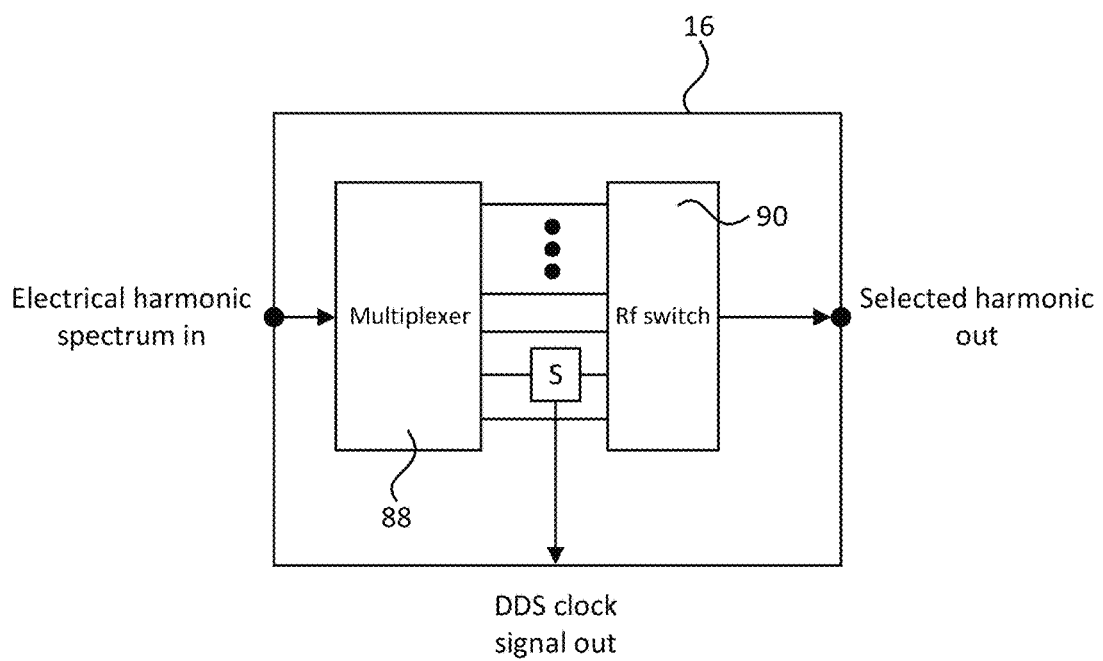
FIG. 14 shows a frequency selector.

As shown in FIG. 14, frequency selector 16 receives the output of the photodetector and passes it through demultiplexer 88. Each channel on the output of demultiplexer 88 contains a single harmonic. The power of one harmonic is split with power coupler 84. One output of power coupler 84 is directed to DDS 18 clock input 20. The other output of power coupler 84 is sent to a multiple input, single output switch 90. The other demultiplexer channels are also sent to switch 90. Switch 90 selects which input to send to frequency converter 22.

Figure 15:
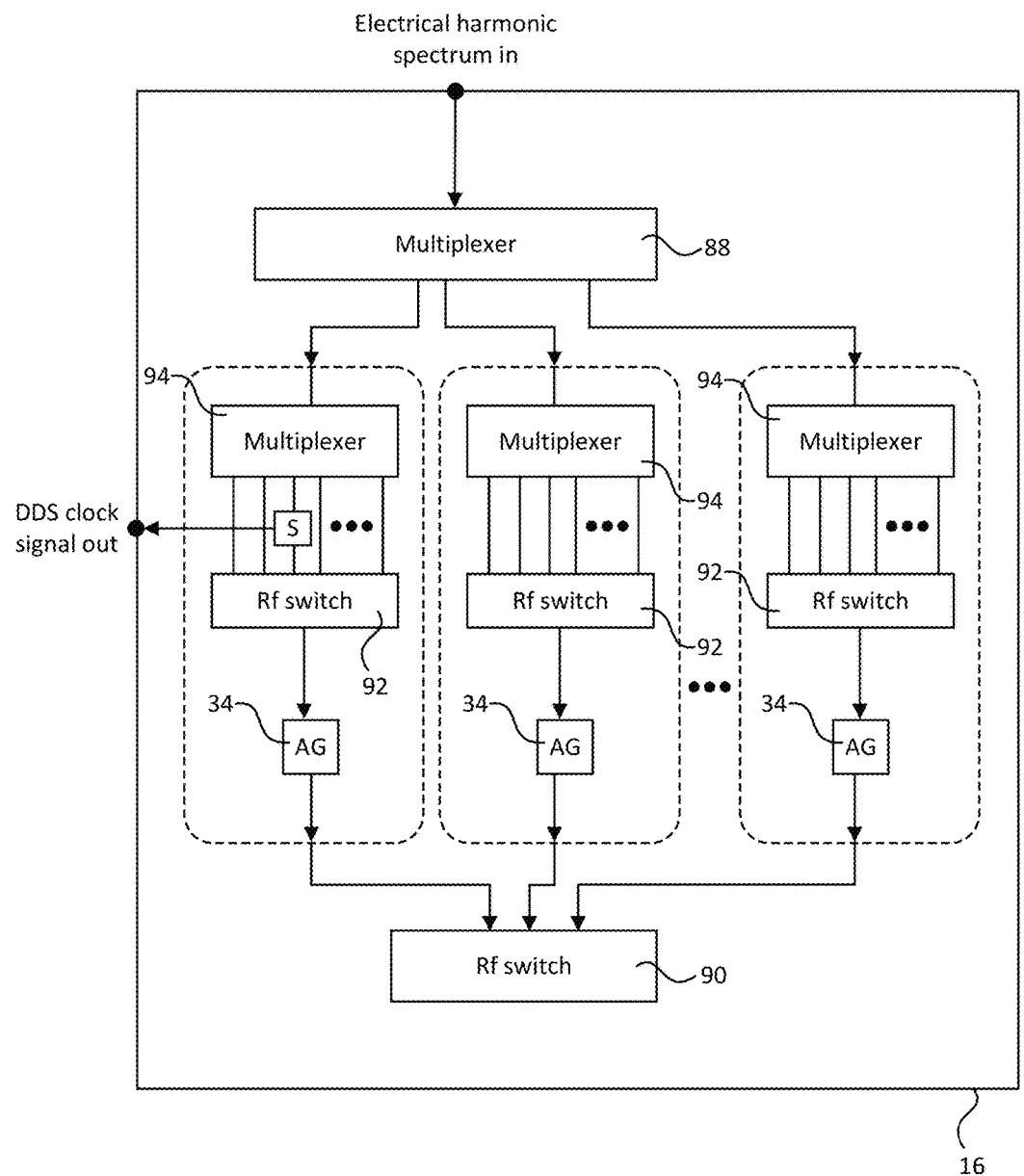
FIG. 15 shows a frequency selector.

In an embodiment, as shown in FIG. 15, a coarse resolution demultiplexer 88 is provided to separate frequency harmonics into a plurality of lumped bands, followed by fine resolution demultiplexers 94 to separate out individual harmonics. Frequency selector 16 receives the output of the photodetector and passes it through coarse demultiplexer 88. Outputs of coarse demultiplexer 88 are directed to inputs of fine demultiplexers 94. Each channel on the output of fine demultiplexers 94 contains a single harmonic. The power of one harmonic is split with power coupler 84. One output of power coupler 84 is directed to DDS 18 clock input 20. The output of each fine demultiplexer 94 is connected to its own switch 92. Switch 92 selects which harmonic of fine demultiplexer 94 is connected to final switch 90. Final switch 90 selects from which of the plurality of switches 92 to send to frequency converter 22.

Frequency converter 22 receives the harmonic selected by frequency selector 16 and mixes it with the output of DDS 18 to produce a different frequency that is the sum or difference of the selected harmonic and the DDS frequency. Since mixing devices are rated over a finite bandwidth, the mixing device will depend on the frequency of the harmonic from frequency selector 16. In an embodiment, as shown in FIG. 16, frequency converter 22 is configured, e.g., for use in signal generator 2 shown, e.g., in FIG. 4. Frequency converter 22 receives the selected harmonic and communicates the harmonic to mixer (96, 98, or 100) via switch 102. Likewise, DDS 18 output Out1 is sent to the same mixer (96, 98, or 100) via switch 104. Mixer (96, 98, 100) output is connected to multiple input, single output switch 106. For synthesis of frequencies up to the maximum frequency output of DDS 18, DDS 18 can connect directly to the output via switch 104 or switch 106.

Figure 17:
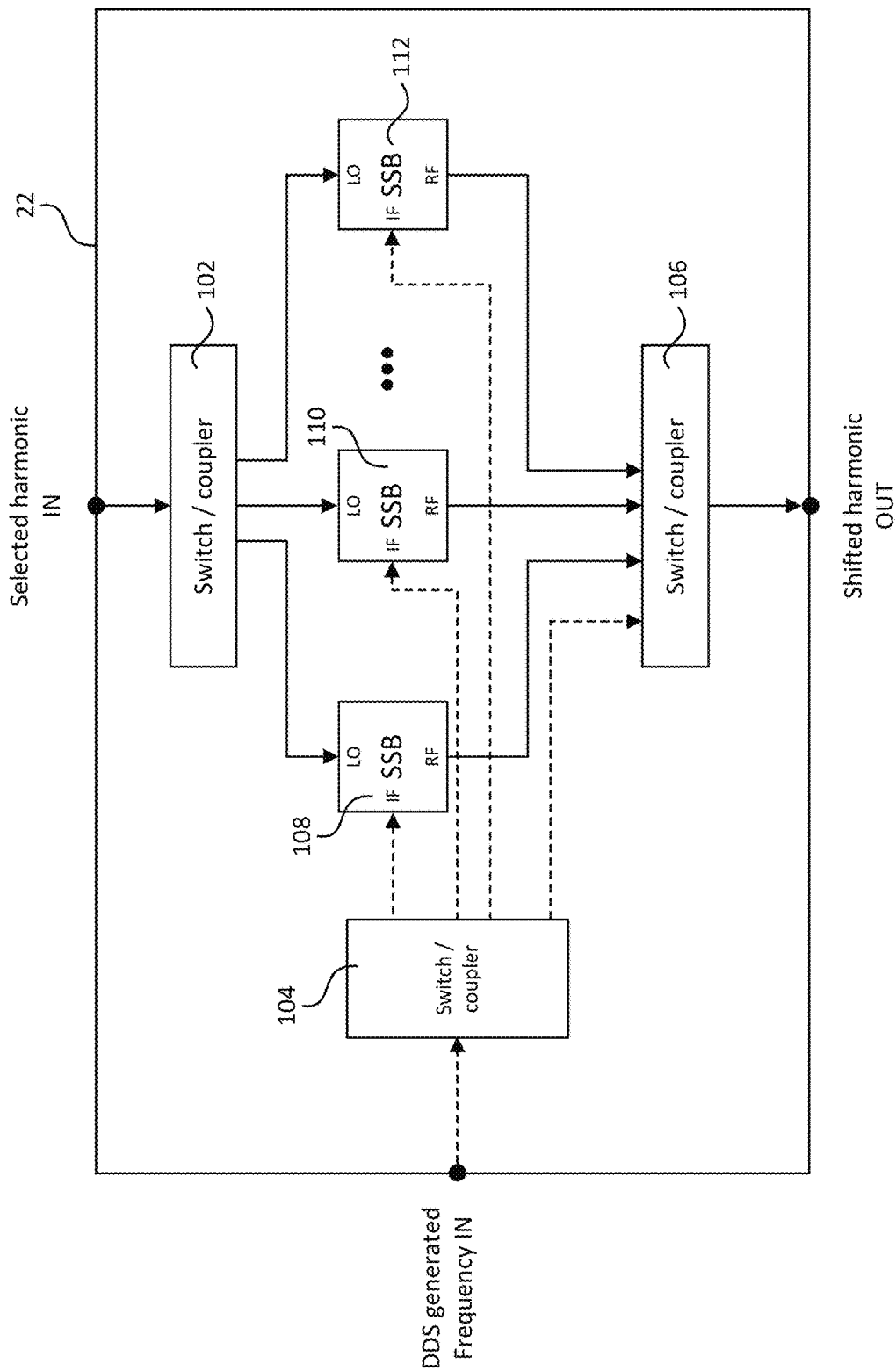
FIG. 17 shows a frequency converter.

In an embodiment, as shown in FIG. 17, frequency converter 22 includes single-sideband (SSB) mixers (108, 110, 112) to suppress a sum or difference mixing product. The selected harmonic is sent to mixer (108, 110, or 112) via switch 102. DDS 18 output Out1 is directed to an IF input of appropriate SSB mixer (108, 110, or 112) via switch 104. Depending on which input is selected, the mixer output frequency is either the sum of the selected harmonic and the DDS frequency, or the difference. Mixer (108, 110, 112) outputs are connected to multiple input, single output switch 106. For synthesis of frequencies up to the maximum frequency output of DDS 18, DDS 18 can connect directly to the output via switch 104 or switch 106.

Figure 18:
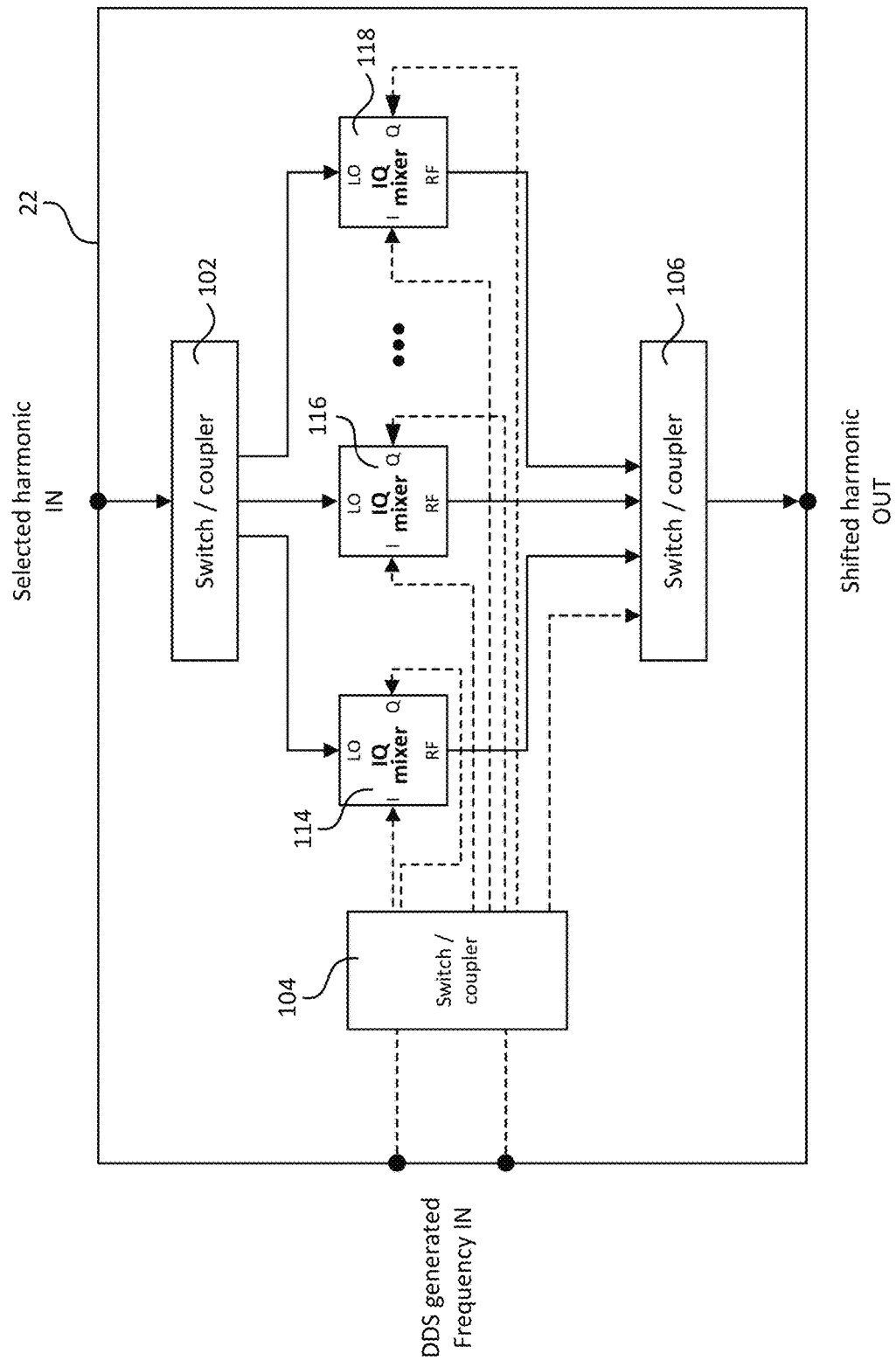
FIG. 18 shows a frequency converter.

In an embodiment, as shown in FIG. 18, frequency converter 22 includes a plurality of I/Q mixers (114, 116, 118) to shift the frequency of the harmonics. DDS output Out1 is sent to switch 104 to select whether DDS output Out1 is sent to switch 106 for direct use as signal generator 2 output or if DDS 18 is used to frequency-shift a selected harmonic. For the selected harmonic path, the output of switch 104 is directed to the I ports and Q ports of I/Q mixers (114, 116, 118). The appropriate I/Q mixer (114, 116, 118) is determined by the frequency of the selected harmonic. The outputs of the I/Q mixers (114, 116, 118) are sent to multiple input, single output switch 106.

Any, some, or all of switches (e.g., 102, 104, 106, and the like) can be replaced by a power splitters/coupler. Any path of a frequency harmonic or DDS output can contain adjustable gain or adjustable attenuation, as selected.

Figure 19:
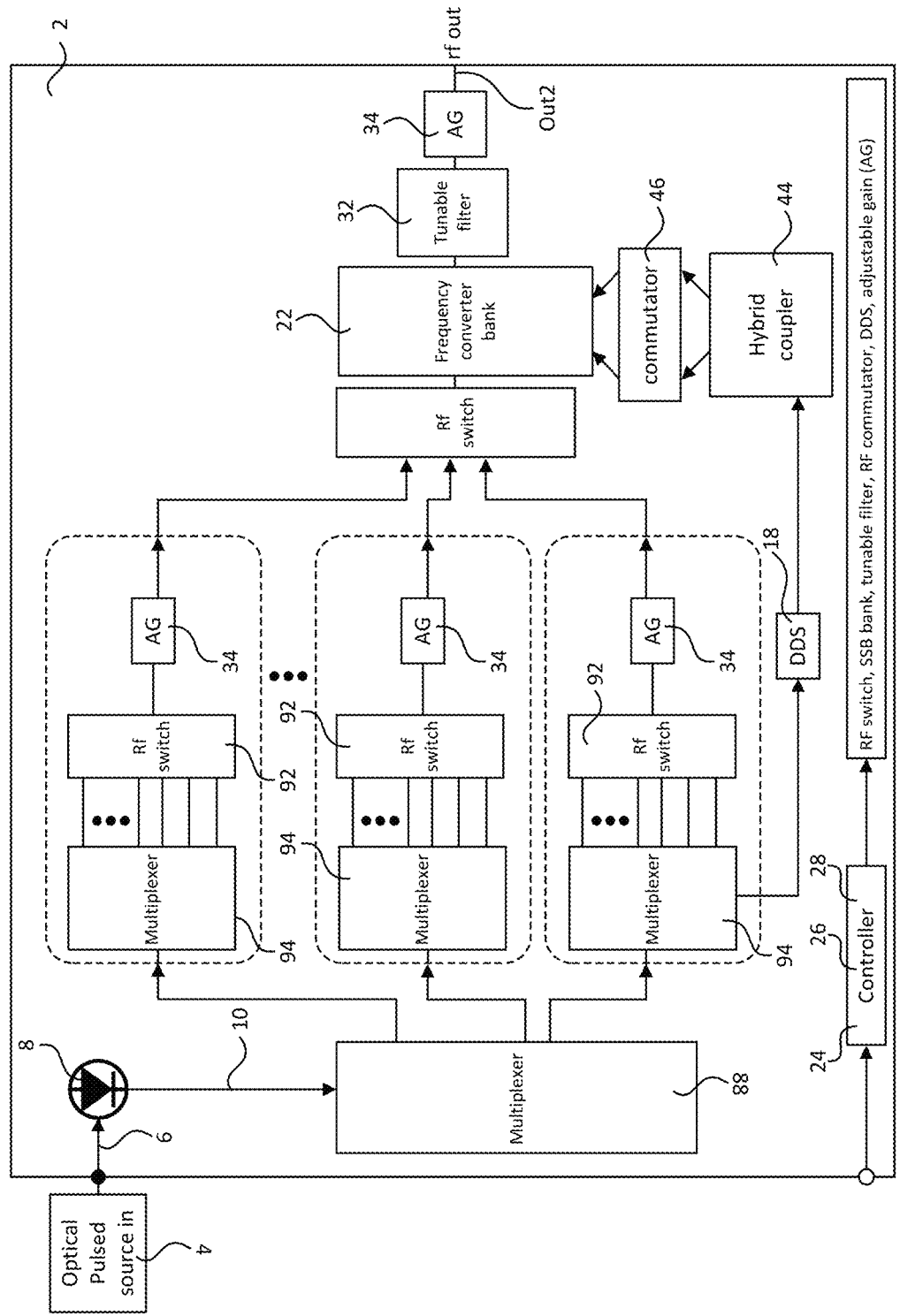
FIG. 19 shows a signal generator.

In an embodiment, as shown in FIG. 19, signal generator 2 can include a variety of components previously described.

Figure 20:
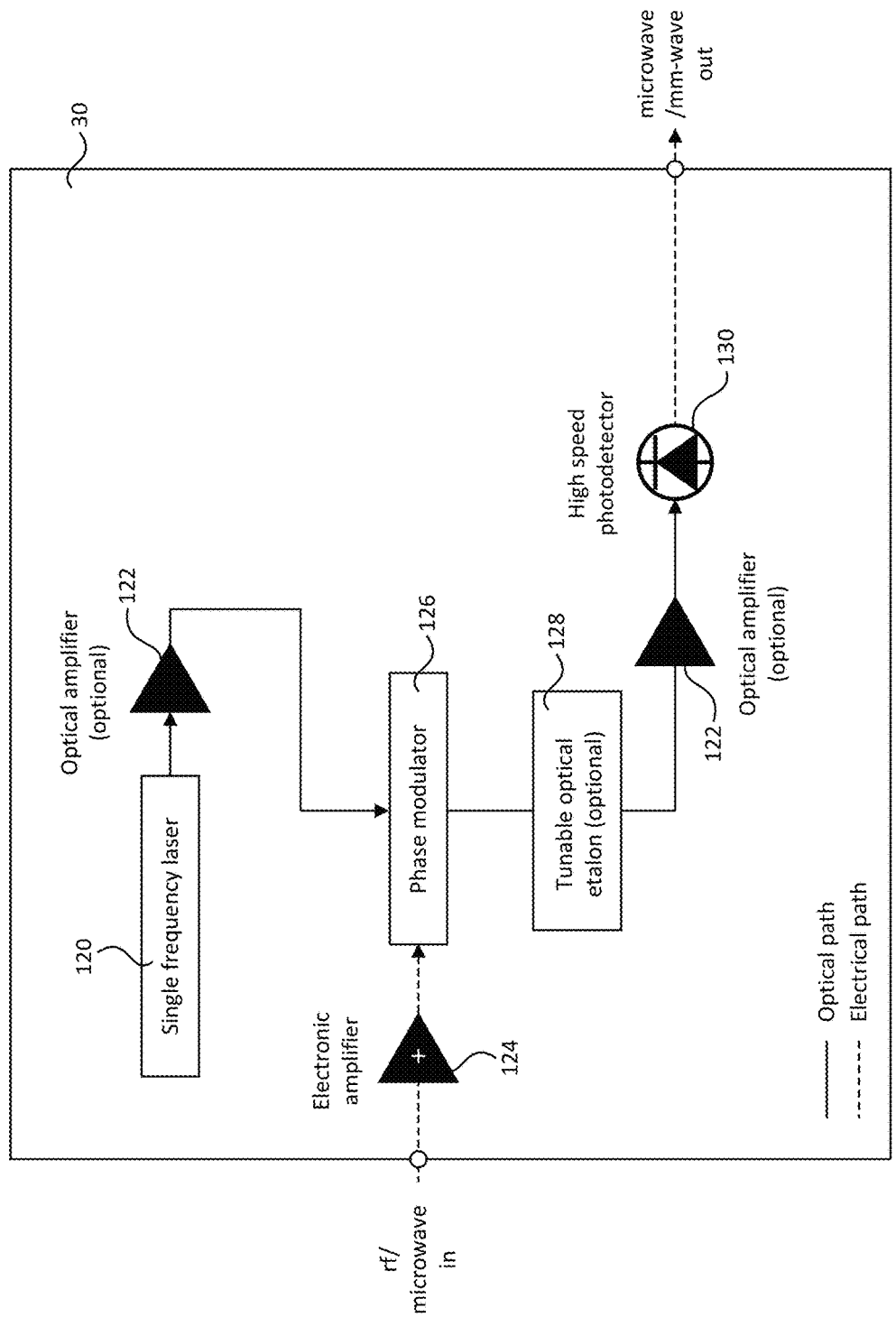
FIG. 20 shows a frequency extender.

According to an embodiment, as shown in FIG. 20, signal generator 2 includes frequency extender 30 to provide third output Out3. Here, second output Out2 is received from frequency converter 22, amplified by amplifier 124, and communicated to phase modulator 126. Single frequency laser 120 produces a frequency that is amplified by amplifier 122 and communicated to phase modulator 126. In output of phase modulator 126 is communicated to tunable optical etalon 128 that produces an output that is communicated to optical amplifier 122 and sent to high-speed photodetector130 to produce third output Out3.

Figure 21:
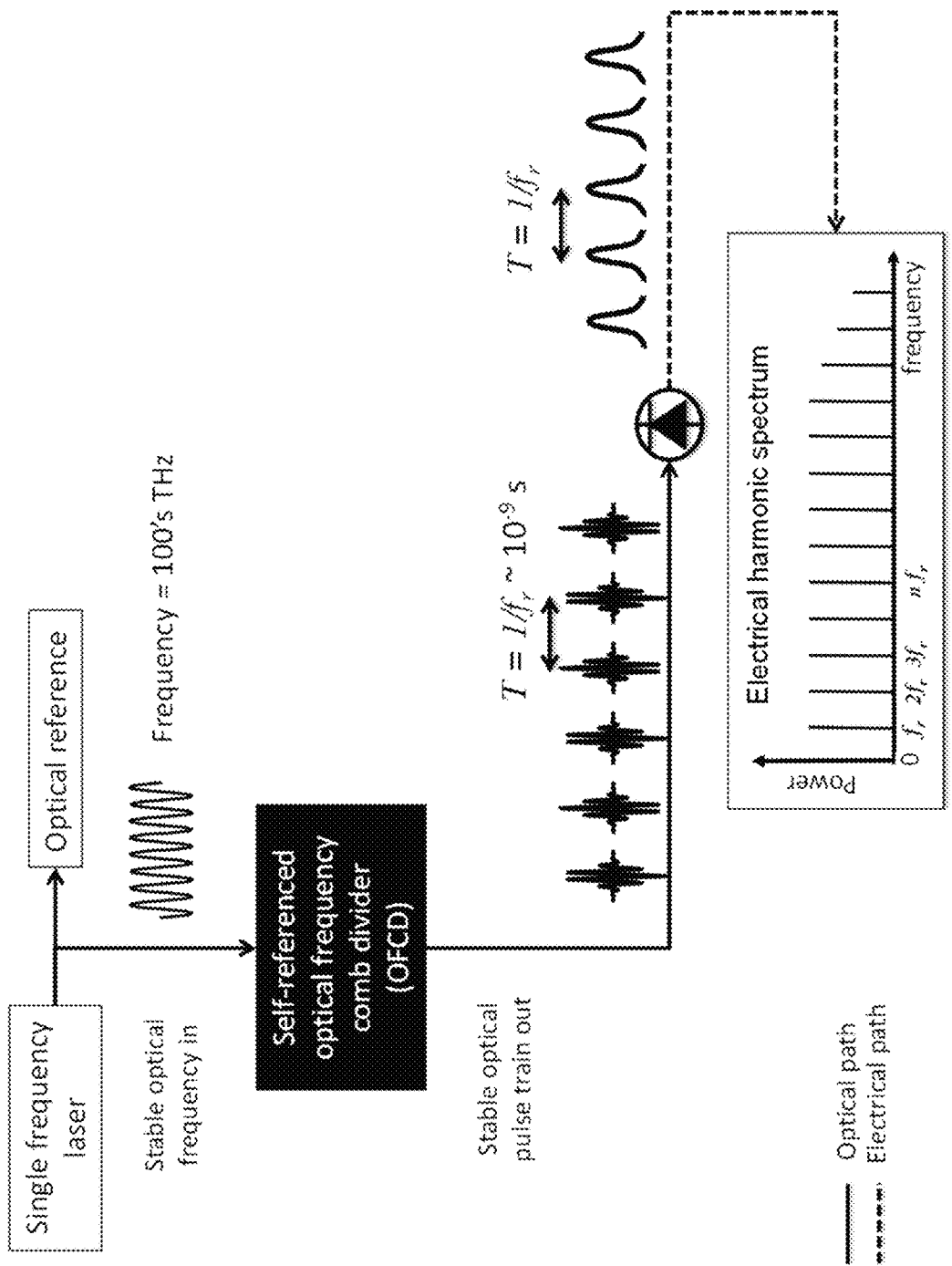
FIG. 21 shows a optical pulses, electronic signal, and a spectrum.

As shown in FIG. 21, signal generator 2 uses optical frequency division of a high stability optical reference The regeneration of a stable electrical harmonic. An optical frequency comb divider converts the stable optical frequency from the optical reference-stabilized laser to a stable train of optical pulses 6. Detection of optical pulses six in optical pulse train provides conversion of optical pulses 60 to electrical signal 10 having spectrum 12 that includes discrete frequencies 14, as shown in the electrical harmonic spectrum included in FIG. 21.

Signal generator 2 has numerous advantageous properties. In an embodiment, signal generator 2 produces a radio wave or microwave signal (e.g., a periodic signal such as a sine wave signal) having phase noise of −100 dBc/Hz at 1 Hz offset for frequencies near 10 GHz, or frequency instability of $2\times10^{-15}$ at 1 second averaging time, e.g., as compared with a conventional signal generator with comparable frequency tuning range and speed. Moreover, it has been found the high frequency stability allows for frequency resolution of 300 µHz near 10 GHz, and $10^{-15}$ frequency imprecision attainable at 1 second averaging time, as compared to a conventional signal generator needing at least 1000 seconds to attain the same low-level imprecision.

Although not so limited, first output Out1 can be a frequency from 1 MHz to 1 GHz. Although not so limited, second output Out2 can be a frequency from 500 MHz to 50 GHz. Although not so limited, third output Out3 can be a frequency from 20 GHz to 300 GHz.

The articles and processes herein are illustrated further by the following Examples, which are non-limiting.

EXAMPLES

A digital-photonic synthesizer architecture herein leverages the timing of optical frequency division (OFD) to exploit the full utility and resolution of direct digital synthesis (DDS). The presented architecture represents a simple and elegant method for enabling wideband, frequency agile, and precise phase tuning of electronic signals while simultaneously supporting the frequency resolution of optical atomic clocks. Using this technique, we demonstrate high fidelity transfer in frequency stability to the microwave and mm-wave domains, achieving frequency agile signals with 15 digits of resolution.

The Photonic Timebase. A synthesizer using a time-base derived via optical frequency division (OFD) offers several technical advantages over architectures based on electronic crystal oscillators. Optical reference cavities exhibit extremely low-loss and drift and thereby achieve much higher quality factors ($Q\sim10^{11}$) and consequently lower instabilities ($10^{-16}$ at 1 s) than electronic resonators. Synthesis begins with the reference at optical frequencies (100's of THz), yielding division as opposed to multiplication of the reference noise power on a derived microwave carrier. Additionally, high-linearity and high-power photodetectors now enable generation of Watt-level microwave carriers, and residual noise supporting frequency instabilities of $10^{-17}$ at 1 s averaging on a 10 GHz carrier, and with a phase noise floor approaching 18 orders of magnitude below the carrier. Consequently, the exceptional noise performance at both low and high offset frequencies enabled by optical frequency division supports microwave signals with sub-femtosecond timing jitter.

Figure 22:
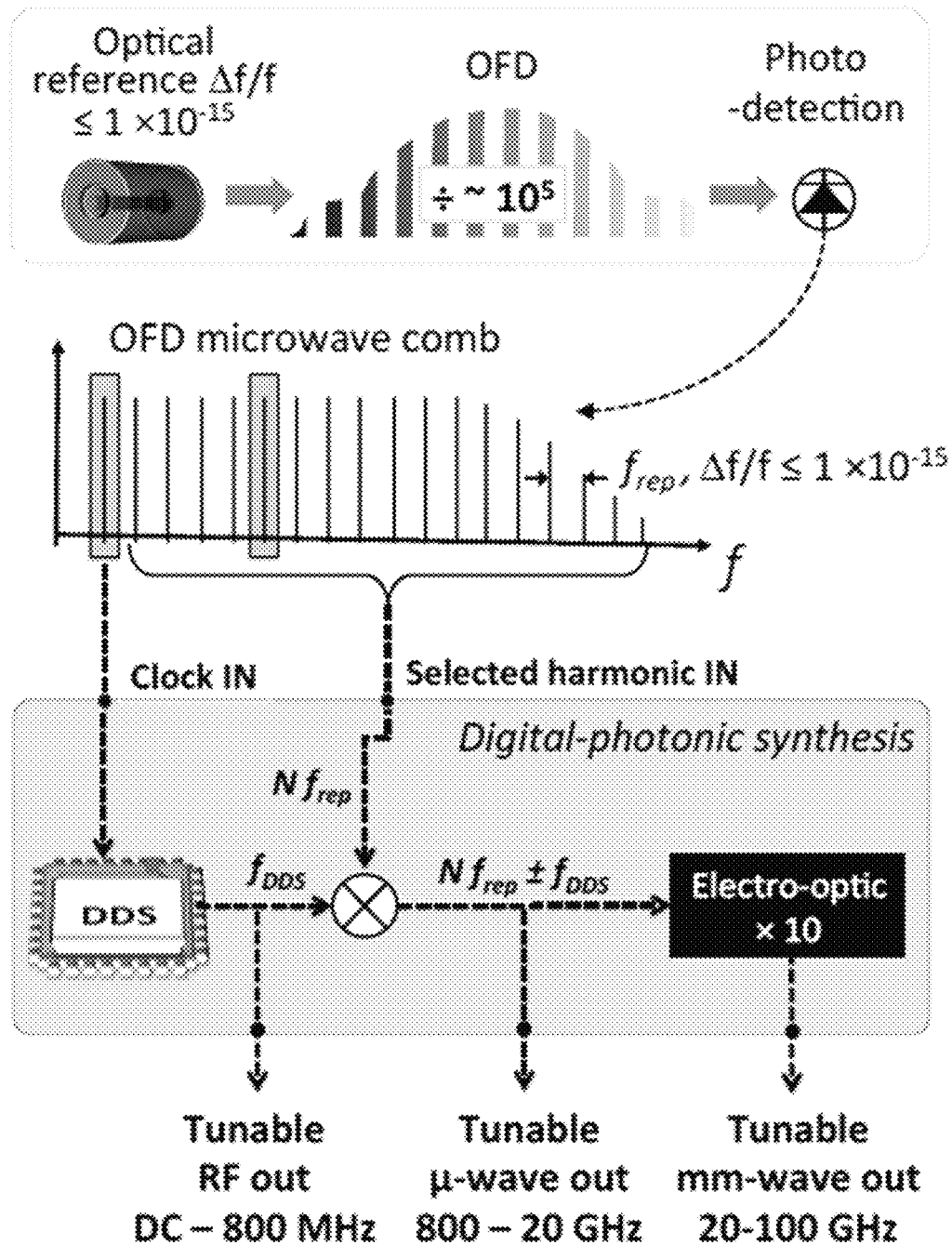
FIG. 22 shows an overview of signal generation from an optical signal source.

FIG. 22 shows a simplified experimental setup for our digital-photonic synthesizer (DPS) with the photonic timebase at the top of the figure. In the measurements to follow, characterization of the spectral purity and frequency stability were achieved via comparison to a second nearly identical but independent system. A more detailed explanation of the experimental setup and measurement technics can be found below.

The microwave frequency comb that serves as the timebase is derived via division by $10^5$ of an ultra-stable frequency reference at 282 THz whose fractional instability less than $10^{-15}$ at 1 second. The frequency spectrum of an optical frequency divider based on a Ti:Sapphire based mode locked laser is stabilized to the single frequency clock laser of an optical atomic clock. This transfers the frequency stability of the optical reference to the timing stability in the mode-locked optical pulse train (11, 26, 27). Detection of this stable optical pulse train is achieved using a modified uni-traveling carrier (MUTC) photodetector, designed for high power handling, high speed, and high linearity (28). The MUTC photodiode performs the optical-to-microwave conversion necessary for derivation of the stable microwave frequency comb. The lowest order harmonic of the microwave comb is the pulse repetition rate, $f_{rep}$, which is 2 GHz for our experimental demonstration. Any one of the myriad tones generated within the bandwidth of the photodiode (PD) may be used as a low noise electronic source that carries the precision of the optical frequency reference.

Figure 23:
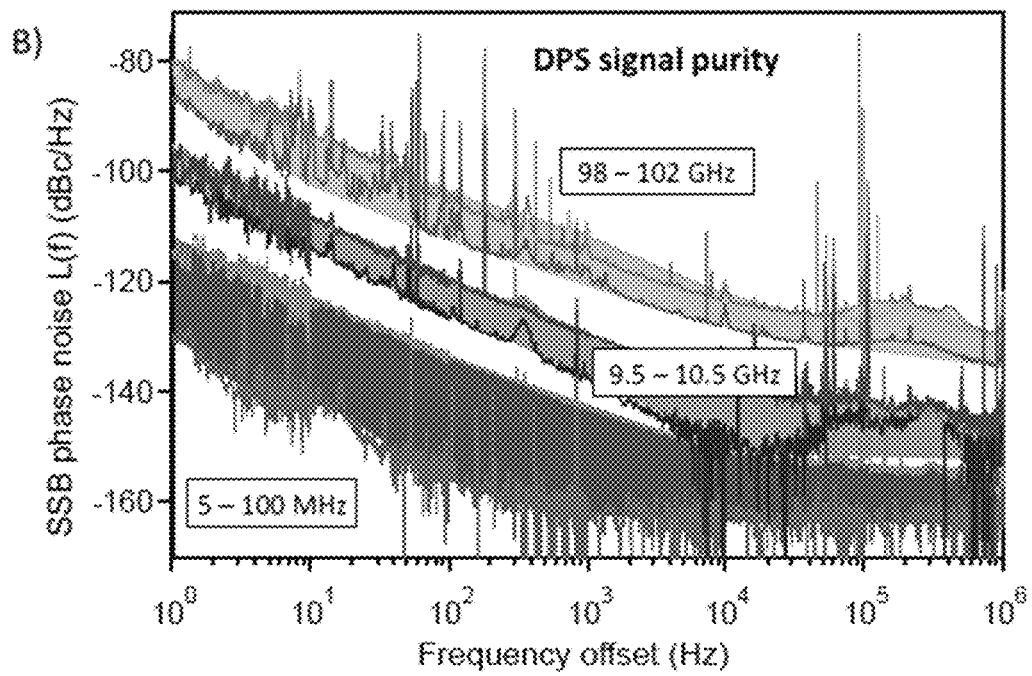
FIG. 23 shows a graph of phase noise versus frequency offset.

Microwave digital-photonic synthesizer. The 2 GHz clock supplied via OFD, however, provides a timing stability that is 100 times better than conventional oven-controlled quartz, and 20 times better than the best oven-controlled BVA quartz. As a result we can achieve continuously tunable RF signals whose timing jitter is limited only by the digital electronics. We observe that the measured phase noise levels shown in FIG. 23 are better than that produced with state-of-the art electronic synthesis (as will be discussed in more detail below). More specifically, the observed spectral purity of the 5 MHz signal is comparable to that of the best fixed frequency quartz oscillator, however, with the full utility of digital synthesis.

Figure 24:
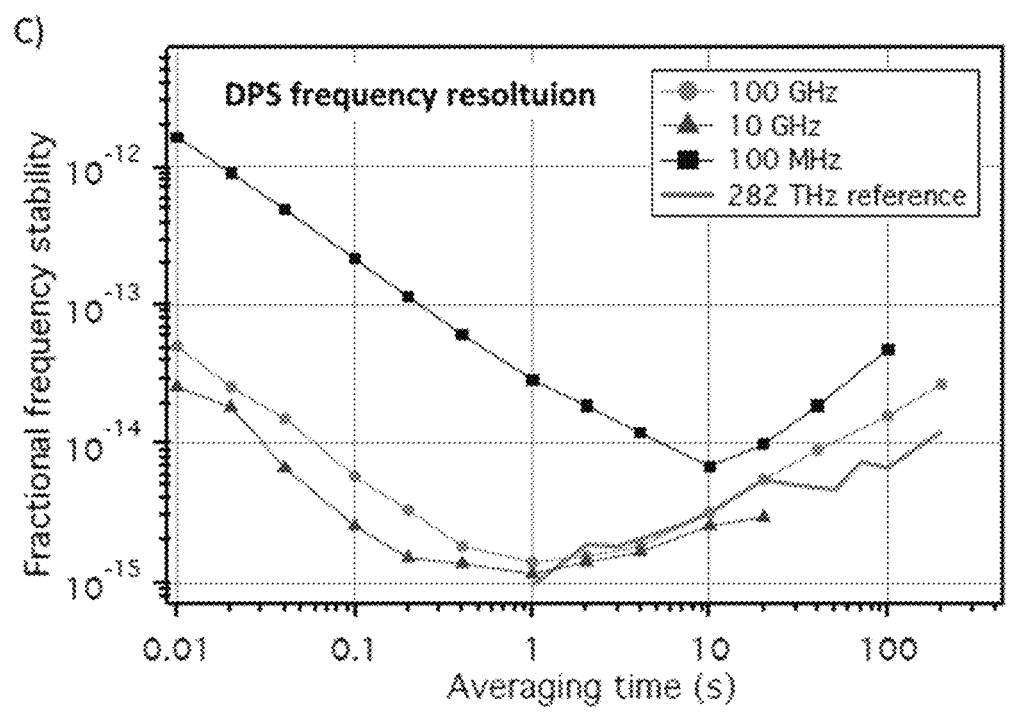
FIG. 24 shows a graph of fractional frequency stability versus averaging time.

As shown in FIG. 23, we quantify the phase noise contributed via synthesis with DDS and find that it is higher than what would be possible with perfect division of the 2 GHz clock signal. For instance, perfect division of the clock signal to 5 MHz would result in a close-to-carrier phase noise level at a 1 Hz offset of less than −165 dBc/Hz. This excess DDS noise above the "ideal" OFD noise levels acts to decrease the frequency resolution on derived RF signals to 14 as opposed to the 15 digits of precision (see FIG. 24). This approach has advantages over traditional synthesis schemes that access higher frequencies via multiplication of the DDS-derived RF signal, and consequently its noise. Here, the signal generator leverages the harmonics of the OFD microwave comb to extend the digital synthesis range. By up- or down-shifting the frequency of any harmonic, N $f_{rep}$, within the OFD spectrum by up to ±$f_{rep}$/2 enables generation of any frequency from near DC up to the highest harmonic detected from the OFD (up to 20 GHz with the photodiode used in our experiments here). Aside from allowing continuous tuning, using this synthesis architecture, the noise in DDS is additive, not multiplicative.

Based on the noise level in FIG. 23, the residual noise in the DDS should be comparable with that of OFD at 10 GHz. As a result, tuning of the OFD harmonics at 10 GHz and above should enable derivation of signals with the stability and spectral purity limited only by the optical reference. To verify this concept we demonstrate the performance when the 10 GHz OFD harmonic is combined with the DDS output to produce a low noise, tunable X-band signal. As seen in the lower portion of FIG. 22, generation of the agile 10 GHz signal is obtained by combining the N=5 harmonic at 10 GHz from the OFD harmonic spectrum with the synthesized output from the DDS using a single sideband mixer. FIG. 23 shows the results of the absolute phase noise of the synthesized signals from 9.5 GHz to 10.5 GHz. In FIG. 23 we see that the phase noise of the native 10 GHz harmonic is −105 dBc/Hz at 1 Hz offset. Synthesis about this carrier results in added noise from the DDS for tuning frequencies greater than 250 MHz. Nonetheless, in FIG. 23 we observe that the synthesized signals from 9.5 GHz to 10.5 GHz maintain a combined close-to-carrier noise below −97 dBc/Hz at a 1 Hz offset. We observe that for tunable 10 GHz signals the combined fractional frequency stability is below $2\times10^{-15}$ at 1 s averaging time, shown in FIG. 24. This measured frequency stability should enable approximately 15 digits of resolution for a single source at a 1 s averaging time.

Figure 25:
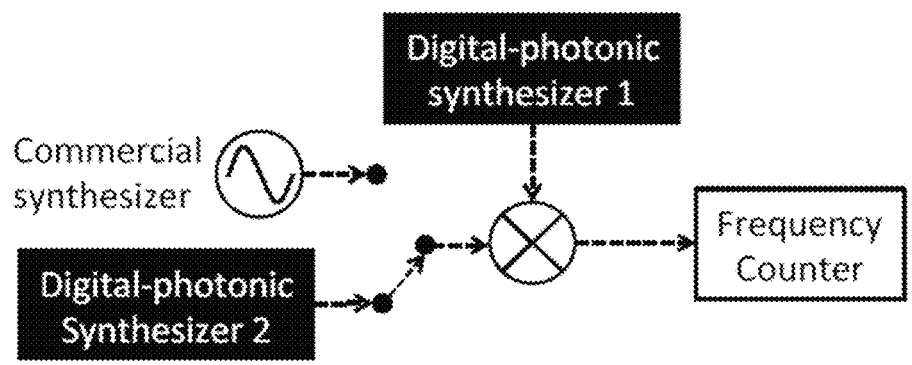
FIG. 25 shows a plurality of digital photonic synthesizers in communication with a mixer.
Figure 26:
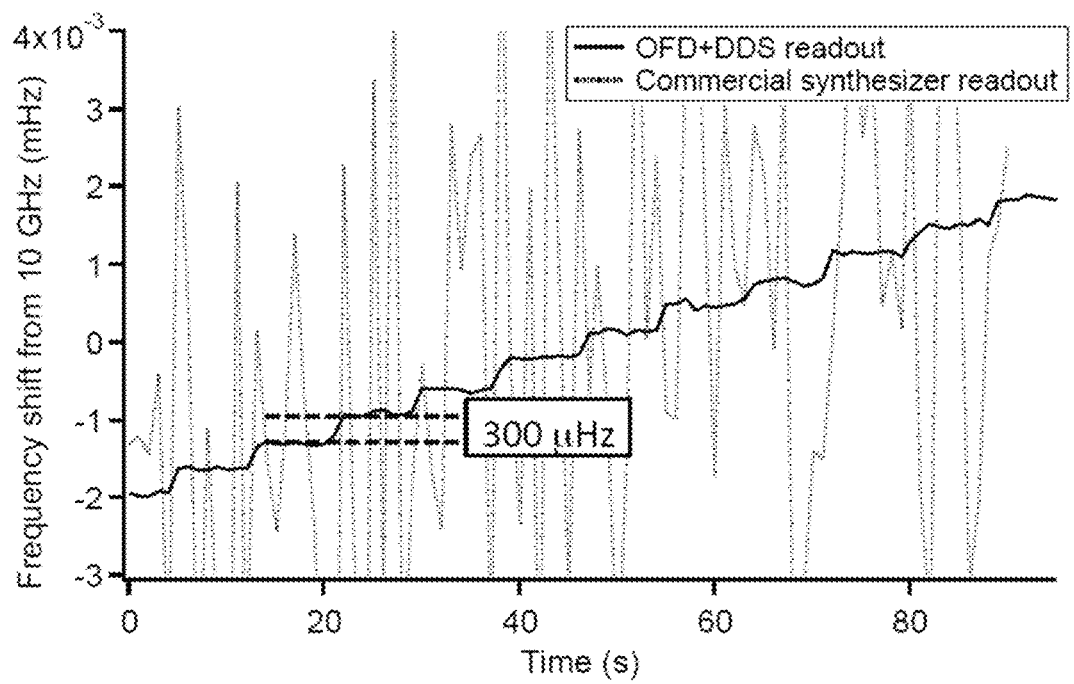
FIG. 26 shows a graph of frequency shift versus time.

As an illustration of the resolution possible with our agile X-band signals, we demonstrate fine frequency stepping of the 10 GHz source. FIG. 25 shows the simplified setup for the readout of a stepped 10 GHz signal from a photonic-digital synthesizer. In our measurement, the synthesizer output was incremented in 300 µHz steps. The 10 GHz stepped source from one digital-photonic synthesizer was mixed with a local oscillator near 10 GHz and the down-converted signal was counted with a gate time of 1 s. FIG. 26 shows the readout of the stepped signal as performed with two local oscillators; a fixed 10 GHz signal from a H-maser referenced synthesizer, and a fixed 10 GHz signal from a second DPS. As seen in FIG. 26, it is possible to resolve the fine frequency steps of the photonically generated 10 GHz signal with a second DPS since the electronically referenced synthesizer lacks the necessary frequency resolution. Although 300 µHz resolution is shown here, an advantage of our synthesis approach is that the ultimate resolution is given by the 64-bit frequency tuning of the DDS, which corresponds to sub nHz frequency resolution. On the 10 GHz carrier, this yields an ultimate frequency resolution greater than 19 digits. Low noise and fine frequency resolution is an attribute of this technique, whose combination can enable improved security in communications by enabling low modulation data encoding, faster carrier detection and frequency hopping.

Extending digital-photonic synthesis to the W-band. We employ electro-optic multiplication of X-band signals derived via DPS to enable both low-noise synthesis and efficient fiber-optic distribution. The latter has immediate applications to radio-over-fiber and at large scale facilities such as free-electron laser centers at, as well as in radio-astronomy.

Figure 27:
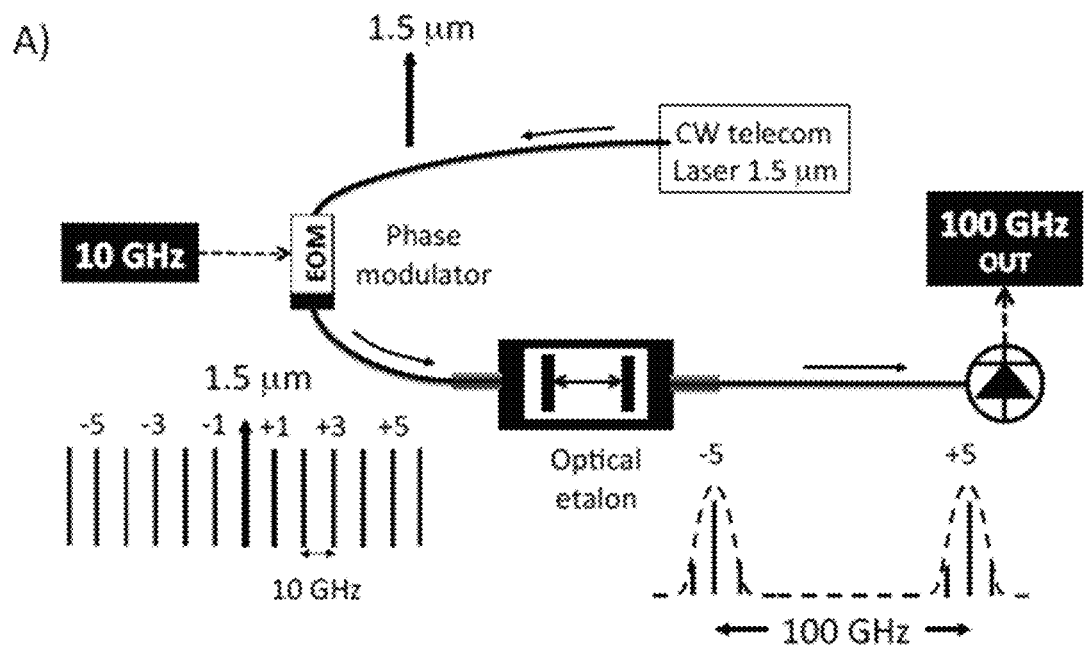
FIG. 27 shows a frequency extender.

FIG. 27 shows 10 times optical multiplication of the 10 GHz DPS signal by phase modulating a continuous wave (CW) laser at 1550 nm with an electro-optic modulator (EOM). The EOM is overdriven by the agile 10 GHz signals, producing multiple phase modulation sidebands (up to greater than ±5 about the CW optical carrier). The resulting 10 GHz spaced EOM comb is then centered midway between the modes of a 100 GHz spaced optical etalon. Filtering with the optical etalon allows for selection of two optical modes separated by 100 GHz with an average optical power of 15 mW. Although the tuning range in our current setup is limited to 98-102 GHz due to the passband of the optical etalon, agility over a larger band should be possible with a tunable optical etalon or a reconfigurable optical filter.

Figure 28:
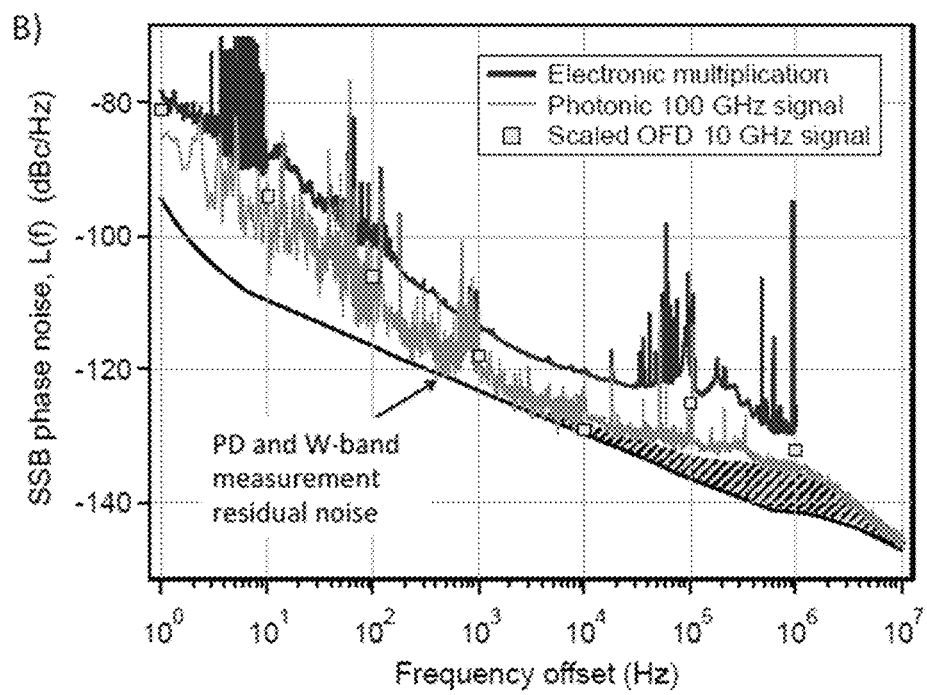
FIG. 28 shows a graph of phase noise versus frequency offset.

Photodetection of the filtered and DPS-modulated 1550 nm laser with a waveguide-coupled unitraveling-carrier (UTC) photodiode generates an electrical 100 GHz signal with −5 dBm carrier strength. FIG. 28 shows the measured phase noise of the generated W-band signals. As seen in FIG. 28, noise added by DDS on the agile 10 GHz source results in a slightly higher phase noise at all offset frequencies. For all synthesized signals in the band 98-102 GHz, the absolute phase noise is observed to be less than −80 dBc/Hz at 1 Hz offset, falling to a noise floor of −144 dBc/Hz at 10 MHz offset from the carrier. The corresponding integrated timing noise is less than 1 femtosecond integrated from 1 Hz to 1 MHz. The observed phase noise levels correspond to a combined fractional frequency instability of less than $2 \times 10^{-15}$ at 1 s averaging time (see below for details), reproducing the stability of the optical reference cavities.

FIG. 28 shows a comparison between the absolute phase noise of W-band signals generated via optical and electronic multiplication of 10 GHz signals generated via DPS. Also shown is the residual noise contributed by the opto-electronic multiplication setup, including the 100 GHz phase noise measurement setup. The dominant source of noise for offset frequencies from 1 Hz-1 kHz results from opto-electronic conversion in the high-speed photodetectors, from which we can estimate an upper limit to the flicker level of $-100 \, f^{-1}$. The shaded area from 10 kHz-3 MHz indicates the combined noise of the 1.5 µm CW laser, FM-to-AM conversion in the optical etalon as well as AM-to-PM conversion in the EOM. We believe the latter to be the dominant noise source in this frequency range. Intensity stabilization of the 10 GHz drive signal could be employed in the future to minimize phase noise due to AM-to-PM in the multiplication setup. From the residual noise measurements above, we find that the opto-electronic multiplication setup can support derivation of mm-wave signals with a frequency resolution at a level of 1 part in $10^{16}$ at 1 s averaging.

Aside from supporting the very low noise possible with OFD, electro-optic modulation allows for efficient dissemination of microwave and mm-wave signals via a telecom carrier. The techniques herein are applicable to generation of a low-noise microwave and millimeter wave signals with significantly improved stability for improved resolution and precision in optical arbitrary waveform generation, optical signal processing and ranging.

Figure 29:
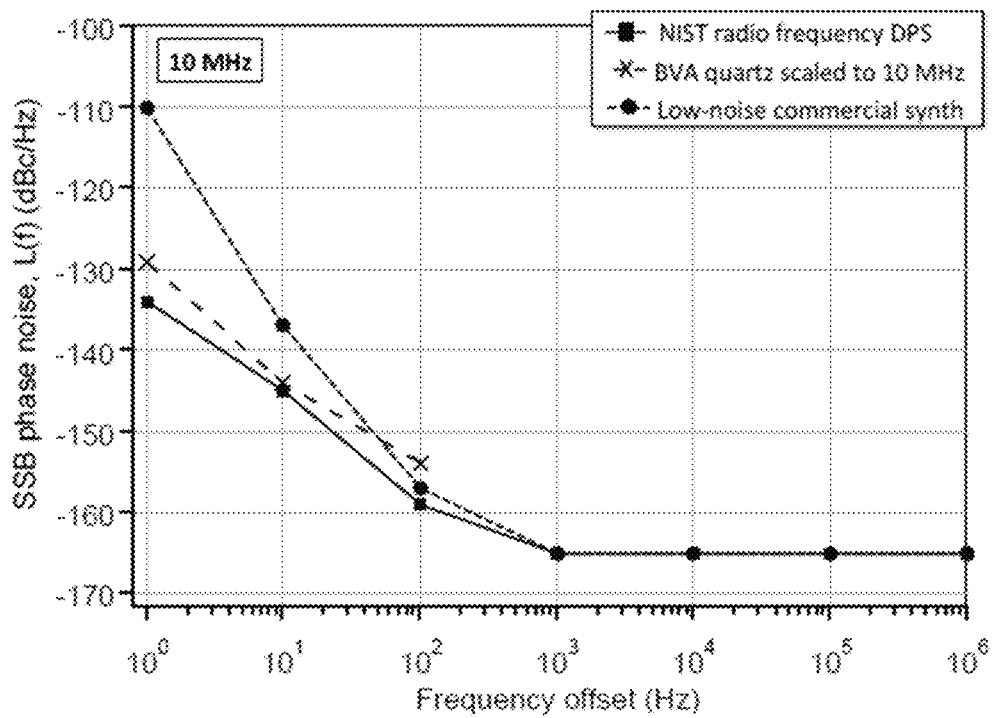
FIG. 29 shows a graph of phase noise versus frequency offset.
Figure 30:
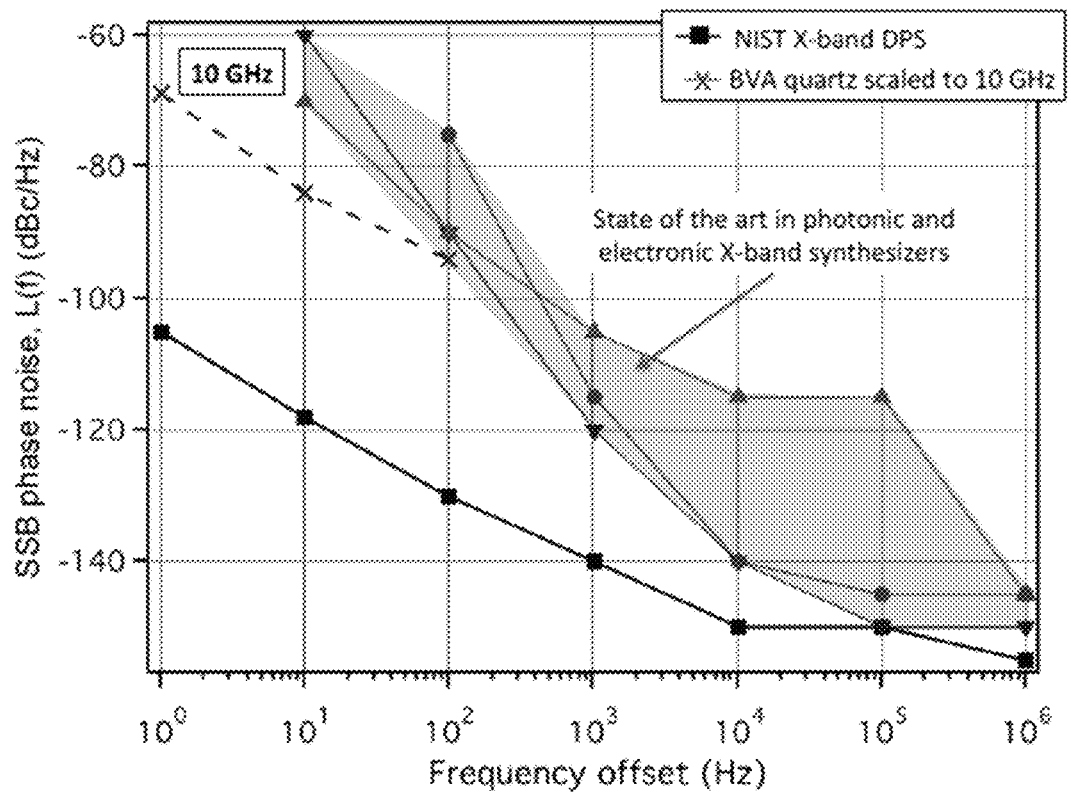
FIG. 30 shows a graph of phase noise versus frequency offset.
Figure 31:
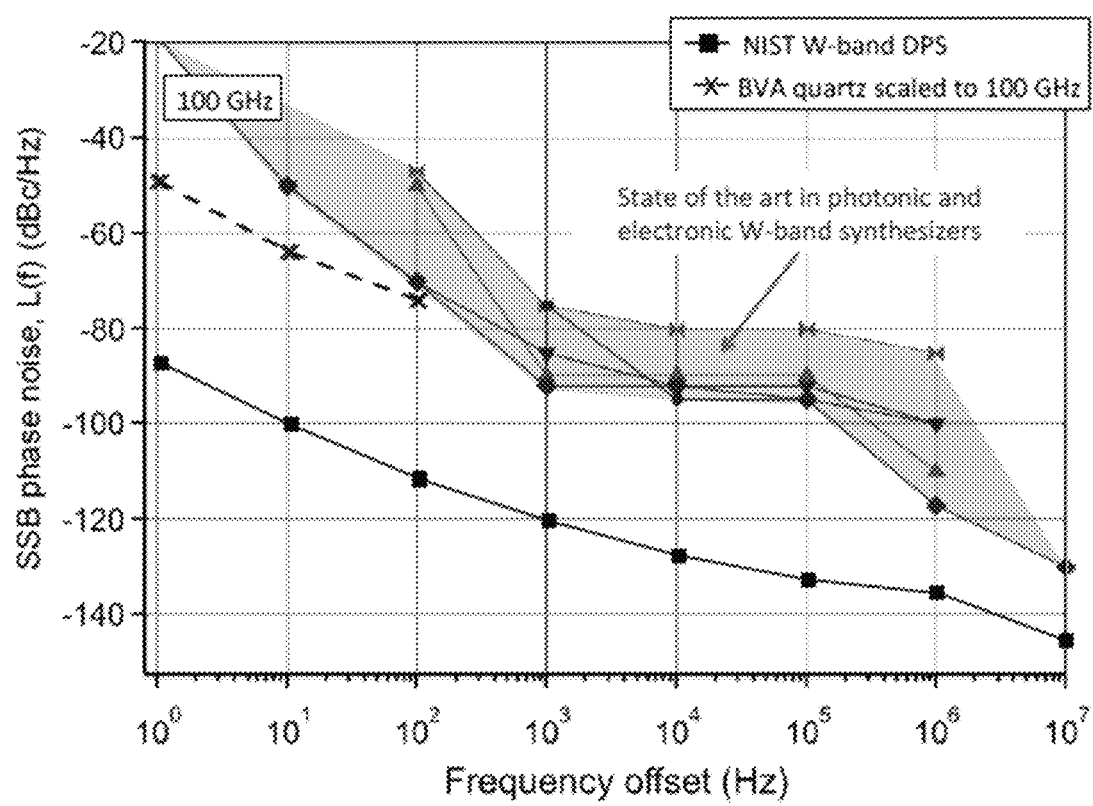
FIG. 31 shows a graph of phase noise versus frequency offset.

Ultra low-noise synthesis of agile RF, X-band, and W-band signals using optical frequency division as the time base to the digital-photonic synthesizer. A comparison with other synthesizers and fixed sources in FIG. 29, FIG. 30, and FIG. 31. As can be seen in FIG. 29, the spectral purity of the RF signals from the signal generator are comparable with the BVA quartz oscillators but with the benefit of digital synthesis. The gains in spectrally purity were greater for tunable signals at 10 GHz and 100 GHz as seen in FIG. 30, and FIG. 31. In the X- and W-band, up to 5 orders of magnitude (>50 dB) and 7 orders of magnitude (>70 dB) improvement in the close-to-carrier phase noise, respectively, were shown. At 100 GHz a 20 dB improvement in high frequency noise at 10 MHz offset was shown.

Figure 32:
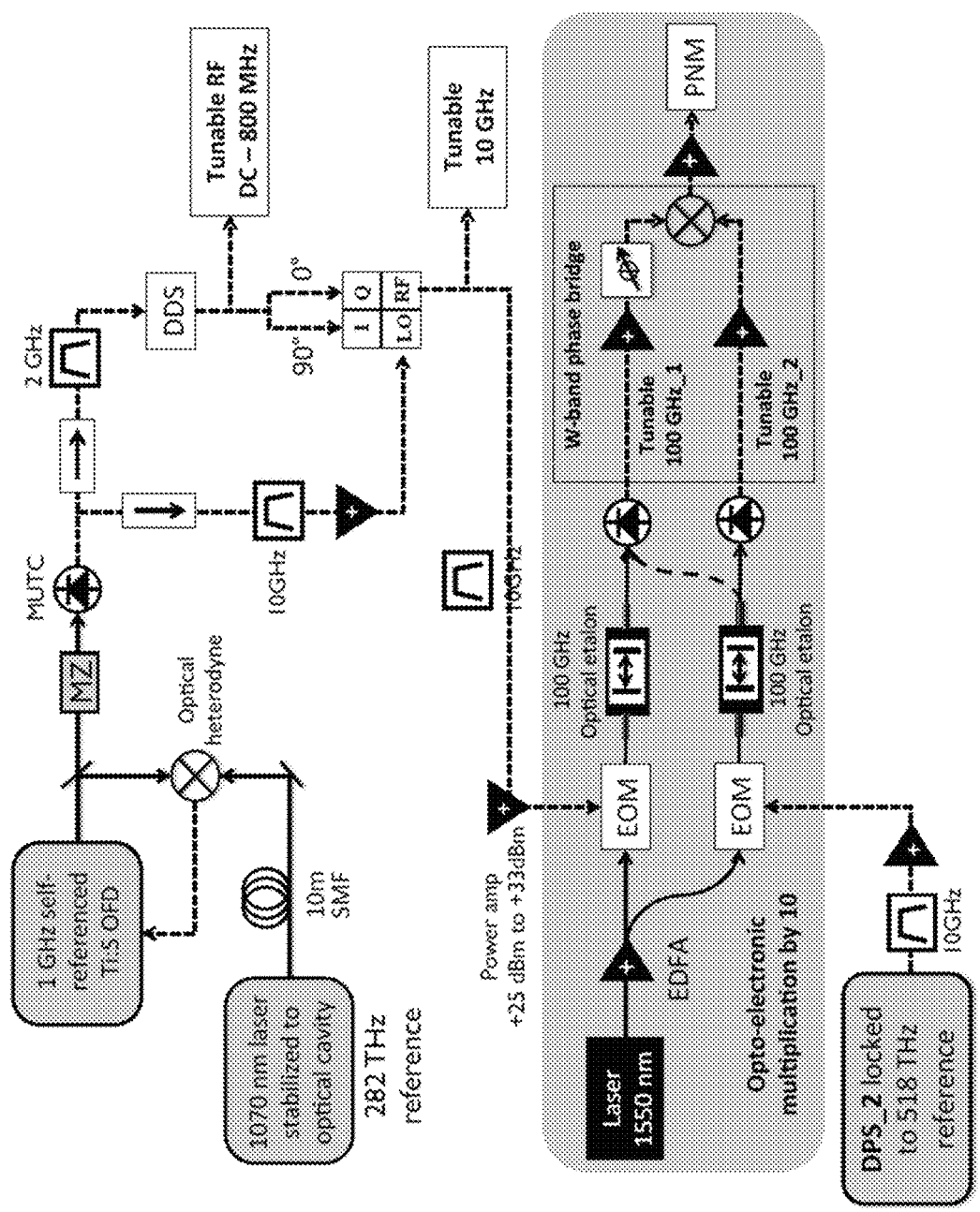
FIG. 32 shows a signal generator.

In measurements in this Example, characterizations of the absolute phase noise and fractional frequency instability were obtained using two nearly identical, but independent digital-photonic synthesizers. This required duplication of the digital-photonic setup to provide a reference system with similar performance. In the sections below we describe the setup for a single system (see FIG. 32) and indicate differences between the two systems.

Optical reference cavity. We employ two optical frequency references, one at 282 THz and the other at 518 THz. The optical frequency references are passive, two-mirror optical cavities constructed with a low-expansion glass ULE spacer with near zero thermal expansion at room temperature. The optical cavity is held in a temperature-controlled vacuum chamber to isolate it from environmental perturbations. The cavity is mounted such that acceleration of the cavity is minimally coupled to changes in length. The cavity exhibits an impressively small absolute length change that averaged over 1 s is less than the diameter of an atomic nucleus (1 femtometer). An intensity-stabilized, single-frequency laser is locked to a single longitudinal mode of the optical reference cavity using the Pound-Drever Hall stabilization scheme. The cavity stabilized light is delivered via noise-cancelled optical fiber to the mode-locked laser that performs division of the optical carrier. Ideally, division of the 282 THz (518 THz) optical carrier to 10 GHz or 100 GHz would reduce the optical phase noise power spectral density by 89 dB (92 dB) or 69 dB (72 dB), respectively.

Optical frequency comb divider. In our experiments we used two optical frequency comb dividers based on passively mode-locked octave spanning Ti:Sapphire laser, both with a native repetition rate of 1 GHz (pulse period of 1 ns, round trip cavity length of 30 cm). Each laser produced greater than 1 W average power with a usable optical bandwidth from 600-1200 nm. The optical comb spectrum is characterized by two RF frequencies, the laser repetition rate $f_{rep}$ and the laser offset frequency $f_0$. Any optical mode, n, of the comb can be described as $v_n = f_0 + n\, f_{rep}$. The optical spectrum of an OFD is stabilized by acting on the laser cavity length using a piezo-actuated mirror, and on the laser pump power via an acousto-optic modulator. This allows for control of the laser repetition rate and the laser offset frequency, respectively. The laser-offset frequency is measured using the technique of self-referencing. The OFD spectrum is stabilized to the optical reference via optical heterodyne with the cavity-stabilized laser described above. This generates a RF beat note that measures the difference between a single comb line and the cavity-stabilized laser. Feeding back to the cavity length of the OFD to stabilize the frequency of the optical beat signal against a synthesized RF frequency transfers the stability of the optical reference to every optical mode of the OFD.

Optical photodetection of the frequency comb. Stabilization of the mode-locked laser spectrum, in the manner described above, results in an optical pulse train with a pulse-to-pulse timing jitter of less than 1 femtosecond. Photodetection with a modified-uni-travelling carrier (MUTC) photodiode is then used to convert the optical pulse train to an electrical one. Pulse interleaving that effectively multiplies the pulse repetition rate from 1 GHz to 2 GHz, alleviates nonlinearities in photodetection by reducing the energy per pulse.

Frequency conversion using DDS and OFD. We employed a DDS (Analog Devices 9914) that can synthesize analog signals, $f_{DDS}$, up to 800 MHz when clocked with the lowest order harmonic from the OFD at 2 GHz. For efficient shifting of the 10 GHz OFD harmonic by the output of the DDS we employed an IQ mixer. This frequency converter has 3 input ports (I, Q, and LO), and one output port, RF. The LO port is driven at +10 dBm with the 10 GHz from the OFD. Ideally, by driving the I and Q ports in quadrature and with equal amplitude at $f_{DDS}$, the IQ mixer produces one strong tone at 10 GHz+$f_{DDS}$ and suppresses both the LO signal at 10 GHz and the image frequency at 10 GHz−$f_{DDS}$. By switching the phases of the I and Q ports by 90 degrees one can choose which image signal is selected. For simplicity a broadband hybrid coupler (5-500 MHz) was employed to split the signal from the DDS input to the I and Q ports of the mixer, which limited our synthesized X-band bandwidth to 9.5-10.5 GHz. Although the amplitude and phase out of the coupler was not perfectly balanced, we observed suppression of the local oscillator and image signals by approximately 30 dB. Careful setting of the phase and amplitude to the I and Q ports of the mixer could significantly improve the suppression of the image frequency, and small DC offsets into the I and Q ports can improve rejection of the LO signal.

The synthesized X-band signals output from two similar but fully independent X-band synthesizers were compared using a double balanced X-band mixer. In our phase noise measurements, the difference frequency between the two tunable 10 GHz signals was always maintained at a difference frequency of 25 MHz. This intermediate frequency was input to a Symmetricom 5125A phase noise analyzer for measurement of the phase noise and fractional frequency stability. A low noise 5 MHz quartz oscillator was used as a stable reference for phase noise and frequency counting measurements (5 MHz phase noise of −120 dBc/Hz at 1 Hz offset).

Opto-electronic multiplication and characterization of 100 GHz signals. For generation and comparison of agile 100 GHz signals, we employed low-loss electro-optic modulators, each driven by independent 10 GHz signals with carrier strengths between 25-30 dBm. The EOMs were used to phase modulate a single 20 mW, 1.5 μm CW laser. Prior to being split between the two EOMs, the laser was amplified to 200 mW using a polarization maintaining Er-doped fiber amplifier. The modulated CW laser was centered midway between the optical modes of the 100 GHz fiber-coupled optical etalons, each with a 10 GHz optical line width. Consequently, the etalon only passed harmonics with the order +5 and −5, yielding two optical lines separated by 100 GHz with residual 10 GHz sidebands −10 dB down from the optical carrier. Using two NEL IOD-PMF, W-band UTC photodiodes, biased at −2 V and directly coupled to a WR10 waveguide, we were able to extract a 100 GHz carrier of −5 dBm (5 mA photocurrent) with approximately 15 mW incident on each photodetector.

The tunable 100 GHz signals from two photodetectors were compared using a W-band phase bridge built from waveguide components. The two branches in the phase bridge, LO and RF, took the signals output from two photodiodes and compared them using a W-band mixer. Both branches of the phase bridge were amplified for operation of the mixer. A low-noise amplifier was used in the RF branch to drive the RF port of the mixer at 0 dBm and a power amplifier was used to drive the LO port of the mixer at +15 dBm. The intermediate frequency output from the W-band mixer at 50 MHz was filtered and amplified and then input to a Symmetricom phase noise test set to evaluate the phase noise and frequency stability.

Evaluation of the W-band photodetector and opto-electronic multiplication setup residual noise, as well as measurement of the absolute 100 GHz phase noise to 10 MHz offset, required that the W-band phase bridge was driven in quadrature by two 100 GHz signals, generated by splitting the optical signal after one of the 100 GHz etalons and illuminating both UTC photodiodes. A phase shifter in the RF branch of the phase bridge was used to place the signals in quadrature. The DC signal output from the mixer was then amplified with a low noise IF amplifier and the combined phase noise measured with vector signal analyzer with a bandwidth of 10 MHz.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A signal generator comprising:
   an optical pulse source to provide a plurality of optical pulses;
   a photosensitive element configured to receive optical pulses and to produce an electrical signal from the optical pulses 6, the electrical signal 10 comprising a spectrum that comprises a plurality of discrete frequencies that occur at a repetition rate corresponding to that of the optical pulses or a harmonic thereof;
   a frequency selector to receive the electrical signal from the photosensitive element, to select dynamically the harmonic from the electrical signal, and to communicate the dynamically selected harmonic;
   a direct digital synthesizer (DDS) to receive the harmonic of the electrical signal from the frequency selector and to produce a first output; and
   a frequency converter to:
      receive the harmonic from the frequency selector and the first output from the DDS; and
      shift a frequency of the harmonic by an amount substantially equal to a frequency of the first output from the DDS to produce a second output.

2. A signal generator comprising:
   an optical pulse source to provide a plurality of optical pulses;
   a photosensitive element configured to receive optical pulses and to produce an electrical signal from the optical pulses 6, the electrical signal 10 comprising a spectrum that comprises a plurality of discrete frequencies that occur at a repetition rate corresponding to that of the optical pulses or a harmonic thereof;
   a frequency selector to receive the electrical signal from the photosensitive element, to select dynamically the harmonic from the electrical signal, and to communicate the dynamically selected harmonic;
   a direct digital synthesizer (DDS) to receive the harmonic of the electrical signal from the frequency selector and to produce a first output; and
   a frequency converter to:
      receive the harmonic from the frequency selector and the first output from the DDS; and
      shift a frequency of the harmonic by an amount substantially equal to a frequency of the first output from the DDS to produce a second output; and
   a frequency extender to receive the second output from the frequency converter and to produce a third output.

* * * * *